(12) United States Patent
Sharifi Mehr et al.

(10) Patent No.: US 11,611,580 B1
(45) Date of Patent: Mar. 21, 2023

(54) MALWARE INFECTION DETECTION SERVICE FOR IOT DEVICES

(71) Applicant: Amazon Technologies, Inc., Seattle, WA (US)

(72) Inventors: Nima Sharifi Mehr, Vancouver (CA); Amit Jagannath Mhatre, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 392 days.

(21) Appl. No.: 16/807,055

(22) Filed: Mar. 2, 2020

(51) Int. Cl.
H04L 9/40 (2022.01)

(52) U.S. Cl.
CPC ........ H04L 63/145 (2013.01); H04L 63/1416 (2013.01); H04L 63/1425 (2013.01)

(58) Field of Classification Search
CPC .............. H04L 63/145; H04L 63/1416; H04L 63/1425
See application file for complete search history.

(56) References Cited

U.S. PATENT DOCUMENTS

| | | | |
|---|---|---|---|
| 8,375,445 B2 | 2/2013 | Higashikado | |
| 9,288,059 B2 | 3/2016 | Nix | |
| 9,413,827 B2 | 8/2016 | Sharma et al. | |
| 9,438,440 B2 | 9/2016 | Burns et al. | |
| 9,508,347 B2 | 11/2016 | Wang et al. | |
| 9,563,854 B2 | 2/2017 | Cruz Mota et al. | |
| 10,193,913 B2 * | 1/2019 | Machlica | G06N 20/00 |
| 10,282,546 B1 * | 5/2019 | Parikh | G06N 3/0445 |
| 10,868,823 B2 * | 12/2020 | Pilkington | H04L 63/14 |
| 10,880,322 B1 * | 12/2020 | Jakobsson | H04L 51/08 |
| 11,399,035 B1 * | 7/2022 | Batchu | H04L 63/0227 |

(Continued)

FOREIGN PATENT DOCUMENTS

WO 20170140710 8/2017

OTHER PUBLICATIONS

U.S. Appl. No. 15/608,748, filed May 30, 2017, Vineet Shashikant Chaoji et al.

(Continued)

*Primary Examiner* — Lynn D Feild
*Assistant Examiner* — Saad Ahmad Abdullah
(74) *Attorney, Agent, or Firm* — Robert C. Kowert; Kowert, Hood, Munyon, Rankin & Goetzel, P.C.

(57) ABSTRACT

Various embodiments of apparatuses and methods for malware infection detection for edge devices, such as IoT ("Internet of Things") devices, are described. In some embodiments, a malware infection detection service receives data from a plurality of edge devices of a remote network. It can identify a variety of different detection mechanisms to detect whether an edge device is potentially infected with malware, and determine confidence levels for the different detection mechanisms. Using the detection mechanisms with the received data, it can determine one or more findings that an edge device is potentially infected with malware. It can then determine a confidence level for each finding. It can then determine an accumulated confidence, based on the confidence levels of the detection mechanisms and the findings. The malware infection detection service might then identify one or more of the edge devices as potentially being infected by malware based on the accumulated confidence.

20 Claims, 11 Drawing Sheets

$$P(X \in C) = P(X = C)$$
$$= \frac{P_{test_1}(X=C) \cdot \ldots \cdot P_{test_N}(X=C)}{P_{test_1}(X=C) \cdot \ldots \cdot P_{test_N}(X=C) + P_{test_1}(X \neq C) \cdot \ldots \cdot P_{test_N}(X \neq C)}$$
$$= \frac{\prod_i P_{test_i}(X=C)}{\prod_i P_{test_i}(X=C) + \prod_i P_{test_i}(X \neq C)}$$

(56) References Cited

U.S. PATENT DOCUMENTS

| | | | |
|---|---|---|---|
| 2003/0110252 A1 | 6/2003 | Yang-Huffman | |
| 2006/0200007 A1 | 9/2006 | Brockway et al. | |
| 2009/0307277 A1 | 12/2009 | Grubov et al. | |
| 2010/0031353 A1* | 2/2010 | Thomas | G06F 21/563 |
| | | | 718/1 |
| 2010/0332149 A1 | 12/2010 | Scholpp | |
| 2011/0200239 A1 | 8/2011 | Levine et al. | |
| 2012/0005755 A1 | 1/2012 | Kitazawa et al. | |
| 2012/0143020 A1 | 6/2012 | Bordoley et al. | |
| 2012/0208161 A1 | 8/2012 | Takata et al. | |
| 2012/0289790 A1 | 11/2012 | Jain et al. | |
| 2014/0058986 A1 | 2/2014 | Boss et al. | |
| 2014/0266684 A1 | 9/2014 | Poder et al. | |
| 2015/0281401 A1 | 10/2015 | Le et al. | |
| 2016/0050264 A1 | 2/2016 | Breed et al. | |
| 2016/0072891 A1 | 3/2016 | Joshi et al. | |
| 2016/0127320 A1* | 5/2016 | Badoni | H04L 63/0272 |
| | | | 726/12 |
| 2016/0164678 A1 | 6/2016 | Nix | |
| 2016/0171371 A1 | 6/2016 | Andrejko et al. | |
| 2016/0188292 A1 | 6/2016 | Carter et al. | |
| 2016/0217387 A1 | 7/2016 | Okanohara et al. | |
| 2016/0239749 A1 | 8/2016 | Peredriy et al. | |
| 2016/0358095 A1 | 12/2016 | Dong et al. | |
| 2017/0093897 A1* | 3/2017 | Cochin | H04L 63/145 |
| 2017/0126704 A1 | 5/2017 | Nandha Premnath et al. | |
| 2017/0227995 A1* | 8/2017 | Lee | G06N 20/00 |
| 2018/0285767 A1 | 10/2018 | Chew | |
| 2019/0036716 A1 | 1/2019 | Kasaragod et al. | |
| 2019/0037040 A1 | 1/2019 | Kasaragod et al. | |
| 2019/0037638 A1 | 1/2019 | Kasaragod et al. | |
| 2020/0359925 A1* | 11/2020 | Boutelle | A61B 5/316 |
| 2021/0012000 A1* | 1/2021 | Halcrow | G06F 21/577 |

OTHER PUBLICATIONS

U.S. Appl. No. 15/666,491, filed Aug. 1, 2017, Adolfo Bravo Ferreira.
U.S. Appl. No. 16/456,850, filed Jun. 28, 2019, Craig Lawton et al.
U.S. Appl. No. 16/584,861, filed Sep. 26, 2019, Lomash Kumar et al.

* cited by examiner $$P(X \in C) = P(X = C)$$

$$= \frac{P_{test_1}(X = C), \ldots, P_{test_N}(X = C)}{P_{test_1}(X = C), \ldots, P_{test_N}(X = C) + P_{test_1}(X \neq C), \ldots, P_{test_N}(X \neq C)}$$

$$= \frac{\prod_i P_{test_i}(X = C)}{\prod_i P_{test_i}(X = C) + \prod_i P_{test_i}(X \neq C)}$$

FIG. 11

MALWARE INFECTION DETECTION SERVICE FOR IOT DEVICES

BACKGROUND

The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, video cameras, etc.

In some cases, IoT devices make use of a connection with a hub device to become a part of a local network of devices. The hub device typically is a more powerful device capable of performing more computations and at a faster rate than IoT devices. For example, a house may have a hub device that forms a wireless connection to multiple different sensor IoT devices, such as thermostats for measuring temperatures of different rooms or motion sensors in different rooms. The hub device may receive temperature values or motion data and transmit the temperature values or motion data to one nor more other endpoints. If the hub device is connected to the internet, then the values may be transmitted to a provider network or a user device, such as the user's smart phone.

Most IoT devices are not powerful enough to implement a robust malware infection detection. However, even for IoT devices that can implement malware infection detection, the reliability of such detection may not be as good as the reliability of a larger malware infection detection service on a more powerful computing device. For example, a malware infection detection service implemented by a service provider network or a server computer may use hundreds of millions of parameters, whereas malware infection detection running on an IoT device may use only a few. Moreover, the amount and the type of data received by a malware infection detection at a given IoT device may change over time. The malware infection detection may lose accuracy and become less useful over time.

BRIEF DESCRIPTION OF THE DRAWINGS

FIG. 11 is an example formula that can be used, in some embodiments, to calculate a conflation of the probabilities or confidences of a malware infection.

Figure 1:
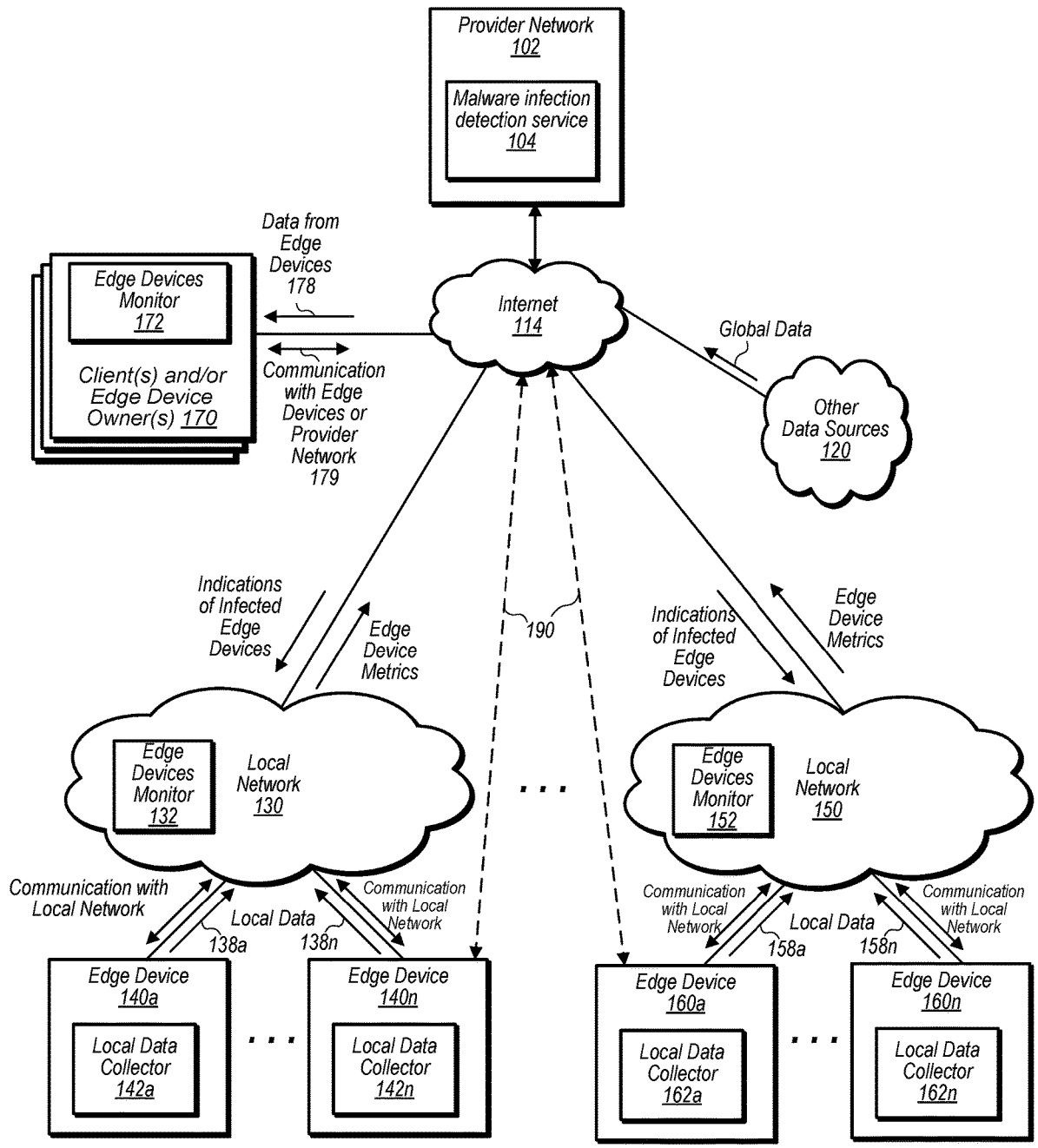
FIG. 1 illustrates an example system environment for malware infection detection for edge devices that comprises a malware infection detection service in a provider network, communicating with a plurality of local networks, clients and/or edge device owners and/or other data sources through the Internet, where the local networks comprise a plurality of edge devices with local data collectors, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION OF EMBODIMENTS

The systems and methods described herein implement malware infection detection for edge devices, such as Internet of Things ("IoT") devices. A malware infection detection service, in some embodiments, receives data from a plurality of edge devices of a remote network, such as IoT devices. The malware infection detection service, in some of these embodiments, identifies a variety of different detection mechanisms to detect whether one or more of the edge devices is potentially infected with malware. The malware infection detection service determines and/or identifies a confidence level for the variety of different detection mechanisms, where a confidence level specifies a confidence for a detection mechanism to identify an infection. Using the received data, in some embodiments, the malware infection detection service might determine one or more findings that one or more of the edge devices is potentially infected with malware. A finding might be based on one, or possibly more than one, of the detection mechanisms, in some embodiments. The malware infection detection service might determine a confidence level each finding, in some embodiments. The malware infection detection service can then determine an accumulated confidence that one or more of the edge devices is infected with malware, based on the confidence levels of the detection mechanisms used, and the confidence levels of the findings that were determined, in some of these embodiments. The malware infection detection service might then identify one or more of the edge devices as being infected by malware based on the findings and the accumulated confidences.

IoT Devices

In some embodiments, the Internet of Things ("IoT") is a system of interrelated computing devices, mechanical and digital machines, objects, animals or people that are provided with unique identifiers (UIDs) and the ability to transfer data over a network without requiring human-to-human or human-to-computer interaction. In the consumer market embodiments, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers. In the commercial context embodiments, IoT technology can apply to the medical and healthcare industry, transportation, vehicular communication systems, and building and home automation, among many others. For example, an Internet of Medical Things ("IoMT") can apply to medical and health related purposes, data collection and analysis for research, and monitoring. The IoMT has can create a digitized healthcare system, connecting available medical resources and healthcare services. In transportation for example, the IoT can assist in the integration of communications, control, and information processing across various transportation systems. In vehicular communication systems as another example, vehicle to vehicle communication ("V2V"), vehicle to infrastructure communication ("V2I"), vehicle to pedestrian communications ("V2P"), and vehicle-to-everything communication ("V2X") are IoT technologies that can be the first step to autonomous driving and connected road infrastructure. In building and home automation as another example, IoT devices can be used to monitor and control the mechanical, electrical and electronic systems used in various types of buildings (e.g., public and private, industrial, institutions, or residential) in home automation and building automation systems. In the industrial context, industrial IoT devices, for example, can acquire and analyze data from connected equipment, operational technology ("OT"), locations and people. Combined with operational technology monitoring devices, industrial IoT helps regulate and monitor industrial systems. In infrastructure embodiments, monitoring and controlling operations of sustainable urban and rural infrastructures, such as bridges, railway tracks and on- and offshore wind-farms is a key application of the IoT. In the military context, the Internet of Military Things ("IoMT") is the application of IoT technologies in the military domain for the purposes of reconnaissance, surveillance, and other combat-related objectives. The above are simply some examples of various types of IoT devices, and is not an exhaustive list of all IoT devices, and therefore is not intended to be limiting.

As many IoT deployments, for many different IoT applications, consist of hundreds of thousands to millions of devices, it is essential to track, monitor, and manage connected device fleets. Connected devices are constantly communicating with each other and a management network using different kinds of wireless communication protocols. While communication creates responsive IoT applications, it can also expose IoT security vulnerabilities and open up channels for malicious actors or accidental data leaks. To protect users, devices, and companies, IoT devices must be secured and protected. The foundation of IoT security exists within the control, management, and set up of connections between devices. Proper protection helps keep data private, restricts access to devices and cloud resources, offers secure ways to connect to the cloud, and audits device usage. An IoT security strategy reduces vulnerabilities, using policies like device identity management, encryption, and access control. Therefore, any organization deploying the IoT devices needs to ensure that the IoT devices work properly and securely after they have been deployed. Such an organization might also need to secure access to the IoT devices, monitor health, detect and remotely troubleshoot problems, and manage software and firmware updates.

IoT Device Management and Security

To solve these and other problems, a provider network can offer IoT device management, in some embodiments. IoT device management of a provider network can make it easy to securely register, organize, monitor, and remotely manage IoT devices at scale. IoT device management of a provider network can allow an organization deploying the IoT devices to register connected devices individually or in bulk, and manage permissions so that devices remain secure. Using a provider network, an organization deploying the IoT devices can also organize its devices, monitor and troubleshoot device functionality, query the state of any IoT device in its fleet, and send firmware updates over-the-air ("OTA"). IoT device management of a provider network can be agnostic to device type and OS, so an organization can manage its deployed IoT devices, such as constrained microcontrollers or connected cars, all with the same service. IoT device management of a provider network allows an organization deploying the IoT devices to scale its fleets and reduce the cost and effort of managing large and diverse IoT device deployments.

A provider network can provide in some embodiments, as part of its IoT device management services, a service that helps an organization deploying the IoT devices secure its fleet of IoT devices. A security vulnerability, for example, can be a weakness which can be exploited to compromise the integrity or availability of your IoT application. IoT devices by nature, are vulnerable. IoT fleets consist of devices that have diverse capabilities, are long-lived, and are geographically distributed. These characteristics, coupled with the growing number of devices, raise questions about how to address security risks posed by IoT devices. Even if an organization has implemented best practices for security, new attack vectors are constantly emerging. To detect and mitigate vulnerabilities, organizations need to consistently audit device settings and health.

To further amplify security risks, many devices have a low-level of compute, memory, and storage capabilities, which limits opportunities for implementing security on devices. IoT devices have a lack of visibility that is common with other types of devices, such as servers, virtual instances, and desktops. With most other types of devices, there is a very rich level of data being collected from these devices. This rich level of data allows for a high level of confidence and a high precision in saying determining an infection and deducing what type of infection it is. Malware detection for these other devices can use this rich data, such as a specific pattern in the network traffic, or specific bytes in the memory, to determine a specific type of virus. However, for IoT devices, many of these types of signals or metrics are not available or possible to be collected because of all the constraints surrounding the IoT devices. For example, some of the IoT devices cannot monitor the memory, either at all or as frequently as needed. As another example, some IoT devices do not have the computing capacity or networking capabilities to monitor the network activities for deep packet inspection.

Malware Infection Detection of IoT Devices

In order to help an organization deploying IoT devices secure its fleet of IoT devices, a provider network can provide a malware infection detection service, in some embodiments. A malware infection detection service can, in some embodiments, audit an organization's IoT configurations to make sure that they aren't deviating from security best practices, for example. A configuration, for example, can be a set of technical controls an organization sets to help keep information secure when devices are communicating with each other and the provider network. A provider network's malware infection detection service can make it easy to maintain and enforce IoT configurations, such as ensuring device identity, authenticating and authorizing devices, and encrypting device data. A malware infection detection service can audit the IoT configurations on an organization's deployed IoT devices against a set of predefined security best practices. A provider network's malware infection detection service can send an alert if there are any gaps in an organization's IoT configuration that might create a security risk, such as identity certificates being shared across multiple devices, or a device with a revoked identity certificate trying to connect to the provider network or to other devices.

A malware infection detection service of a provider network can also let an organization continuously monitor security metrics from deployed IoT devices, and from the device management service of the provider network, for deviations from what the organization has defined as appropriate behavior for each IoT device. If something is wrong, the malware infection detection service of the provider network can send out an alert so the organization can take action to remediate the issue. For example, traffic spikes in outbound traffic might indicate that a device is participating in a DDoS attack. The malware infection detection service of the provider network can publish security alerts to a variety of locations, in some embodiments, such as, for example, an IoT console service, a provider network's notification service, or a messaging service. These security alerts can be published when, for example, an audit fails or when behavior anomalies are detected. These security alerts can inform an organization to allow it to further investigate and determine the root cause. For example, the malware infection detection service of the provider network can alert an organization when device identities are accessing sensitive APIs. The malware infection detection service might also recommend actions for the organization to take to minimize the impact of security issues, in some embodiments. These actions can include such actions as revoking permissions, rebooting a device, resetting factory defaults, or pushing security fixes to any of the connected IoT devices.

A client of a provider network, such as an organization deploying a fleet of IoT devices, can setup metrics to monitor, and thresholds for those metrics, manually, in some embodiments. The client can then translate those metrics and thresholds into security findings in order to detect security issues with their devices or network. However, this setup can be time-consuming for the clients and can require detailed knowledge of the devices, the network, the applications running on the devices, and/or how those devices use the network to communicate with other devices, the network, and the Internet. Even with this knowledge, it can take many iterations to specify the correct set of metrics to monitor, and the thresholds to use for those metrics, so that non-malicious behavior is not triggered, while malicious behavior is triggered. For example, consider a scenario where an infected device is abused for launching a volumetric denial of service attack, such as a TCP SYN flood. Looking at the TCP traffic volume spike in isolation and independent from factors such as the shape of network traffic, content of network packets, destination of network traffic, or considering the historical traffic patterns of a device, a device's legitimate sensory data upload to its offsite storage could create a similar network traffic spike. Hence, a client may often need to increase types of behavioral signals or metrics, and/or modify their monitoring and/or thresholds, in order to disambiguate legitimate and illegitimate device behavior.

Some embodiments of the malware infection detection service can remove this previously described manual setting of metrics and thresholds that are then translated into security findings, in order to detect security issues with the devices or network. Some embodiments of the malware infection detection service can detect IoT device malware automatically without as much input or setup from the client. Some embodiments of the malware infection detection service can help an organization deploying IoT devices secure its fleet of IoT devices by capsulizing as much as it can from weak signals, or nodes that have less visibility, to determine if an infection exists. In some embodiments, weak signals are combined to establish that a device is infected by some unknown software, i.e. malware. These weak signals or metrics might not be sufficient on their own to establish an infection. However, some embodiments of the malware infection detection service can combine multiple findings, depending on what their nature is, to establish whether a device or devices are infected.

Malware Infection Detection Methods

In order to detect an infected device, there are at least two general methods of detection, in some embodiments: threat intelligence and behavioral patterns. Threat intelligence, in some embodiments, identifies that a device is infected by a specific malware using their known indicators, such as dropped file hashes or specific content signatures, and connections to their botnet's command and control servers ("C&C"). These indicators are often available from threat intelligence sources that actively track malware and botnets and publish their indicators in form of threat intelligence feeds. Behavioral patterns, in some embodiments, identifies that a device is infected using its observed behavioral patterns that conform to various stages of a device infection such as reconnaissance, infiltration, persistence, and abuse.

With threat intelligence, the quality of threat intelligence feeds can vary based on factors such as their collection strategy (i.e. using honeypots, malware detonation, manual reverse engineering) and their implementation specifics (i.e. algorithms to extract botnet related network locations from a dropped malware or from interactions with honeypots). Placing blind confidence in the quality of threat intelligence feeds independent of these quality factors can degrade the quality of device infection detection using threat intelligence. The type of threat intelligence feed has to be considered for its effective use in identifying infected devices. For example, in using malicious IP address feeds, inbound connections from malicious IP addresses should be differentiated from outbound connections to them. Inbound connections from a malicious IP address to a device may indicate any of a) connections from a botnet controller to a backdoor installed on the device, b) connections from other infected devices to download a malicious payload hosted on the device, or c) connections in attempt to infect the devices (i.e. mass random internet-wide scans). Hence, with all these possibilities on inbound connections, one cannot confidently establish that the device has been infected without looking at other evidences. In contrast, outbound connections to a malicious IP address from a device can be less ambiguously attributed to connections to a botnet C&C or payload distribution host. Completeness and timeliness of threat intelligence feeds vary based on their sources. For example, a single threat intelligence source may not track specific type of botnets (i.e. due to missing the required infrastructure to attract and engage a botnet), or may have delays in publishing the indicators (i.e. due to slow manual processes involved in vetting the feeds before publication). Hence, threat intelligence source(s) should be chosen based on their capabilities in tracking IoT specific malware and botnets. Additionally, the possibility of not receiving indicators for all relevant IoT malware and botnets from the threat intelligence sources and/or having a mixed quality in published indicators should be accounted for.

With behavior patterns, individual behavioral patterns common to infected devices may have significant similarities to legitimate device behavior. For example, consider a scenario where an infected device is abused for launching a volumetric denial of service attack such as TCP SYN flood. Looking at the TCP traffic volume spike in isolation and independent from factors such as the shape of network traffic, content of network packets, destination of network traffic, or considering the historical traffic patterns of a device, a device legitimate sensory data upload to its cloud storage could create a similar network traffic spike. Hence, we may often need to increase types of behavioral signals/metrics and their associated information to disambiguate legitimate and illegitimate device behavior. Due to a lack of visibility to more behavioral signals/metrics (i.e. infeasible to perform deep network packet inspection on devices) or because of poor signal quality (i.e. direction of open connections on the device are unknown), we may have to rely on heuristics (i.e. guessing the direction of an open connection on a device based on its local and remote port numbers, or based on known open ports on the device in conjunction with local and remote ports for the open connection) to address deficiencies in quantity and quality of behavioral signals/metrics collected from devices. An infected device often presents more than one behavioral pattern common to infected devices in more than one time window. In contrast, it is less likely that a device's legitimate behavioral patterns overlap with multiple behavioral patterns common to infected devices. For example, a typical infected device may show patterns of all the following behaviors at the same time window or across multiple neighboring time windows: regular connections to C&C servers, probing other devices with randomly generated or selected IP addresses for malware propagation, having an unusual port open, communicating over an unusual protocol/port, and performing a TCP SYN flood denial of service attack against a victim target.

Detection Mechanisms

Each of these generic methods of detection mentioned above, as well as other generic methods of detection, can be used to implement specific detection mechanisms, in some embodiments. For example, using the threat intelligence method, mechanisms can be created to detect events, such as a device connecting to known botnet command and control ("C&C") servers, or the execution of a known malware payload on a device. Similarly, using the behavioral patterns method as another example, mechanisms can be created to detect events, such as a device performing a volumetric denial of service attack, or a device distributing malware to other potential victims.

A multitude of factors can influence the accuracy of each individual mechanism in identifying an infection successfully, depending on the embodiment. Hence, the overall confidence-level for the detection mechanisms in identifying an infection can be established, in some embodiments. In addition, where applicable, a confidence level for each, or at least some of, a detection mechanism's specific findings should also be established or determined, in some embodiments. These two confidence levels can be used for establishing the sufficiency of a specific finding for reporting an infection, in some of these embodiments.

Therefore, in some embodiments, two factors can be established for the detection mechanisms. The first factor, in these embodiments, is the confidence level of an infection if a specific detection mechanism is triggered. For example, if a device communicates with an unusual geo-location, the confidence to actually call out an infection might be 40%. This 40% can mean, for example, that a device is infected in about 40% of the occasions that it communicates with an unusual geo-location. The second factor, in these embodiments, is the confidence level of a specific finding of a detection mechanism. Each detection mechanism might not always have a confidence level of its maximum confidence for every specific finding. For example with geo-location, the confidence level for mapping an IP address to a geo-location varies, and when an IP address is looked up in a geo-mapping database a confidence level might be returned. This confidence level of mapping an IP address to a geo-location would impact the original 40% confidence of establishing an infection for a single device using geo-location, for example. The amount of total confidence from a single detection mechanism will decrease, in these embodiments, based on the confidence of a specific finding.

As another example, consider a detection mechanism that is designed to identify malware propagation behavior on a device. If the detection mechanism has visibility into network traffic packets and is capable of detecting malware payloads in the outbound traffic, then it may have an overall confidence factor of 1.0/1.0. However, in order to detect malware, this detection mechanism can instead use a combination of known malware signatures and heuristics. Hence, the confidence level for each specific finding can be adjusted based on which internal feature is used: 1.0/1.0 for matches against known malware signatures, and a confidence level between 0.5/1.0 and 0.7/1.0 for heuristic-based findings, for example. Alternatively, this detection mechanism can be broken into two separate mechanisms, in some embodiments, where one can indicate a definite infection and the other one has lower variable confidence in detection. In an example implementation, we can adjust the confidence for a specific finding using a formula such as [detection's overall confidence] *[detection's finding specific confidence]. If the outcome is above a configured threshold, in some embodiments, then an infection can be reported.

The ultimate purpose of a detection mechanism, in some embodiments, is to identify a device infection or its indications. While a detection mechanism is not expected to necessarily call out a definite infection, a mechanism should at least report findings which are intuitively or heuristically understood as a possible indication of a device infection, in some of these embodiments. Hence, generic anomaly detection mechanisms with no clear correspondence to at least one known or possible infection scenario should be avoided, in some embodiments. This approach not only ensures the overall accuracy of the detection system, but also allows device owners to use the reported findings as infection evidence in understanding and investigating a reported detection, in some embodiments.

The overall confidence of each detection mechanism can be calculated based on its accuracy measurement tests, in some embodiments. In some of these embodiments, a detection mechanisms' accuracy can be measured from its true positive detection rate in successfully identifying infections or their indications in a large sample set of clean and infected devices with relevant indications. To ensure continuous detection accuracy, these test runs can be repeated regularly, in some of these embodiments, with the emergence of new types of infection and/or on-boarding of new clients or types of devices.

Each detection mechanism can include a confidence level and related evidence for any of its reported findings. The determination of a confidence level for reported findings can be calculated for the finding based on the mechanism's internals, in some embodiments. A per-finding confidence level is different than a mechanism's fixed overall confidence. The metadata and evidence associated with a finding depends on its detection mechanism, but it might also include high-level information to express the factors involved in its decision making process, in some embodiments. For example, each finding reported by detection mechanism of Anomaly:Device/UnusualOutboundTraffic-!GEO may derive its confidence level from (a) the number of usual geo-locations for outbound connections from the device, and (b) the confidence level reported by the service/database that is used for IP address to geo-location mapping. This detection mechanism may also provide evidence for the findings that includes the historical geo-profile of outbound connections from devices, as well as any observed unusual outbound connections and their geo-mapping, in some of these embodiments. The metadata and evidence associated with a reported finding can be used to determine the confidence level for the finding.

In some embodiments, there might be a brand new edge device, such as a brand new IoT device. In these embodiments, there might not exist enough metrics from the new edge device for a detection mechanism, or a malware infection finder, or a findings confidence level determinator to use in determining findings or confidence levels for the new edge device. In these situations, proxy metrics from other related edge devices can be used until the new edge device has been in operation long enough. In this way, the malware infection detection service does not have to wait to make determinations and findings regarding that new edge device. For example, the new edge device might be part of a particular group of edge devices, and therefore should behave in a similar fashion as the other edge devices in the group. Further, in some embodiments, a malware infection detection service might require 14 days of training data per edge device. Therefore, instead of waiting 14 days to perform any evaluation for a new edge device, components of the malware infection detection service, such as the detection mechanisms, or the malware infection finders, or the confidence level determinators, can perform an aggregation function from the metrics of the other related devices and use those metrics as a proxy for the particular new edge device. The metrics of the other related devices can be used as proxy for the particular new edge device for a certain initial startup period of time, in some embodiments. This certain initial startup period of time can be, for example, 14 days. After the initial startup period of time, the malware infection detection service can use the new edge device's actual metrics, in some embodiments.

Types of Detection Mechanisms

The following Table 1 lists a set of example preliminary detection mechanisms that can be implemented using example device and cloud metrics, with an example assumed source of threat intelligence for the corresponding threat intelligence detection mechanisms. In the example below, all non-threat-intelligence based mechanisms are from a family of "anomaly" detection, but there are many other types and families of non-threat-intelligence based mechanisms that are not listed in the example Table 1 below. These are mainly listed to give an example of some different types of detection mechanisms, and are not intended to be limiting. In Table 1, the following format is used for naming the detection mechanisms: "'Mechanism_Family': ['Device'|'Cloud']/'Mechanism Type'!'Mechanism_Variant'"

TABLE 1

| Detection Mechanism | Significance |
| --- | --- |
| Anomaly:Device/InterruptedTelemetrySignals | Sabotage of security controls |
| Anomaly:Device/UnusualNetworkListeners!OpenPorts | Backdoor installation, malware distribution |
| Anomaly:Device/UnusualNetworkListeners!ClosedPorts | Sabotage of security controls and administration interfaces |
| Anomaly:Device/UnusualNetworkListeners!NetworkInterafces | Backdoor installation, malware distribution |
| Anomaly:Device/UnusualOutboundTraffic!Volume | Denial of Service attack, Malware propagation, Network traffic proxy |
| Anomaly:Device/UnusualOutboundTraffic!Protocols | Denial of Service attack, Malware propagation, Command and control communication |
| Anomaly:Device/UnusualOutboundTraffic!RemotePorts | Denial of Service attack, Malware propagation, Command and control communication, Network traffic proxy |
| Anomaly:Device/UnusualOutboundTraffic!RemotePortsNum | Reconnaissance |
| Anomaly:Device/UnusualOutboundTraffic!RemoteHosts | Denial of Service attack, Malware propagation, Command and control communication, Network traffic proxy |
| Anomaly:Device/UnusualOutboundTraffic!RemoteHostsNum | Reconnaissance, Malware propagation, Network traffic proxy |
| Anomaly:Device/UnusualOutboundTraffic!GEO | Denial of Service attack, Malware propagation, Command and control communication, Network traffic proxy |
| Anomaly:Device/UnusualOutboundTraffic!ASN | Denial of Service attack, Malware propagation, Command and control communication, Network traffic proxy |
| Anomaly:Device/UnusualOutboundTraffic!ConnectionsNum | Denial of Service attack, Malware propagation, Network traffic proxy |

TABLE 1-continued

| Detection Mechanism | Significance |
| --- | --- |
| Anomaly:Cloud/UnusualActionAttempts | Device credentials stolen/abused |
| Anomaly:Cloud/UnusualTopicSubscriptions | Device credentials stolen/abused |
| Anomaly:Cloud/UnusualTopicPublishes | Device credentials stolen/abused |
| Anomaly:Cloud/UnusualActionOrigins!GEO | Device credentials stolen/abused |
| Anomaly:Cloud/UnusualActionOrigins!ASN | Device credentials stolen/abused |
| ThreatIntel:Device/SuspiciousOutboundTraffic!MalwareHosts | Malware payload drop |
| ThreatIntel:Device/SuspiciousOutboundTraffic!CnCHosts | Command and control communication |
| ThreatIntel:Device/SuspiciousOutboundTraffic!MiningPools | Cryptocurrency mining |
| ThreatIntel:Cloud/SuspiciousActionOrigin!ProxyHosts | Device credentials stolen/abused |
| ThreatIntel:Cloud/SuspiciousActionOrigin!TorExitNodes | Device credentials stolen/abused |
| ThreatIntel:Cloud/SuspiciousActionOrigin!MaliciousHosts | Device credentials stolen/abused |

Confidence Accumulation of Detection Mechanisms

Using the confidence-based approach, individual detection mechanisms may not always, or ever, reach or pass a threshold to report an infection based on their own confidences. Therefore the results of each of the detection mechanisms can be combined in order to determine whether the threshold to report an infection has been reached. As an aside, this threshold might be configured by the client, or by the service, and/or might be modified based on feedback, such as by machine-learning techniques, depending on the embodiment. For example, a finding of an unusual geo-location for a device's communication with a 20% overall confidence that a device is infected could be combined with a finding of an unusual amount of outbound traffic with a 40% overall confidence that a device is infected. In order to avoid losing the information from these lower-confidence mechanisms or their lower-confidence specific findings, an accumulative approach can be used in combining the findings from individual detection mechanisms. Then, the accumulated confidence can be used to decide about reporting an infection.

Combining multiple findings to determine whether an infection exists is not a trivial task. Some embodiments of the malware infection detection service establish at least two factors for an identification of a malware infection. These factors can be, for example, the detection mechanisms which can be used to determine whether a device is infected. The results of the detection mechanisms can be accumulated to make a final determination whether a device or devices are infected. An example of a detection mechanism is the number of IP addresses that a device connected to over a period of time, such as 5 minute time window. Another detection mechanism can be the geo-location of the IP address that a device connected to, for example. Many detection mechanisms detect anomalies independently or in isolation from each other. By putting multiple of these detection mechanisms together, one can establish a higher level of confidence that a device or devices are infected, whereas each individual detection mechanism might not be sufficient to detect an infection on its own.

As another example, consider an infection detection system with a reporting threshold of 0.9/1.0 and two detection mechanisms: (a) SYN flood denial of service detection with an overall confidence of 0.9/1.0 and a specific finding confidence in range of 0.5/1.0 and 1.0/1.0, and (b) malware propagation detection with an overall confidence of 0.8/1.0 and a fixed specific finding confidence of 1.0/1.0. If mechanism (a) reports a finding with confidence of 0.8, that translates to an overall confidence of mechanism (a) of 0.8*0.9=0.72. If mechanism (b) reports a finding, on the other hand, that results in an overall confidence of 0.8*1.0=0.8. The confidences of these two individual findings from these two different detection mechanisms can be accumulated to determine an accumulated confidence that can be used to decide about reporting an infection.

There are many different methods or algorithms that can be used in combining the findings from individual detection mechanisms into an accumulated confidence. One method can be "conflation" that calculates probabilities from multiple events that have their own probabilities into one single probability. To combine the detection confidence from multiple detection mechanisms, the formula in FIG. 11 can be used, which is one embodiment to calculate the "conflation" of the probabilities/confidences of an infection.

Using the formula in FIG. 11, the conflated/accumulated confidence of the two detection mechanism example above can be calculated, and once calculated it can be compared to the example's reporting threshold of 0.9 to determine that the accumulated confidence passes the set threshold, in this example:

Infection Confidence=(0.72*0.8)/[(0.72*0.8)+(1−0.72)*(1−0.8)]=0.91

When using the conflation method to combine the findings from individual detection mechanisms into an accumulated confidence, the method works optimally when the probabilities of the findings from the individual detection mechanisms are independent from each other. Using the conflation confidence accumulation method above, it is best to ensure that the detection mechanisms are independent from each other and do not cause confidence exaggeration. If there are two different detection mechanisms that have some form of overlap, for example, based on their underlying cause, then the conflation formula will not be as accurate. For example, if there are two detection mechanisms and one mechanism is mapping the IP address of a device's communications to a geo-location, and another detection mechanism the IP address to an ISP name or ASN, then both of these detection mechanisms are using the same database, and both are using the IP address, and there is a high probability that when one of the detection mechanisms is triggered that the other one will also be triggered. Therefore, these two detection mechanisms are not really independent of each other. Using the conflation formula in FIG. 11, while possible and doable, might provide for some inaccuracies.

As another example, consider a system that implements two detection mechanisms of "Abuse:Device/SYN-Flood!DoS" and "Anomaly:Device/UnusualOutboundTraffic !Volume". It is likely that for every finding reported by the detection mechanism of "Abuse:Device/SYN-Flood!DoS", there is also a finding reported by the detection mechanism of "Anomaly:Device/UnusualOutbound-Traffic !Volume". Therefore, these two detection mechanisms are not really independent of each other either. Additionally, for effective use of the conflation-based accumulation, it would be better to have a large set of sample data for performance measurement tests, but this large set of sample data might not be easily available, in some embodiments.

To address the concerns above, an infection detection system might use a heuristic approach in accumulating confidence of individual detection mechanisms. Combination formulas can be created, in some embodiments. These combination formulas might be created when it cannot be guaranteed that detection mechanisms are independent from each other, in some of these embodiments. These combination formulas can specify, for example, that if one detection mechanism triggers confidences at a certain level, that this affects another detection mechanism. The combination formulas can specify a combination of different detection mechanisms that are needed, or a total number of findings from all detection mechanisms that are needed, depending on the embodiment. Combination formulas and/or other heuristics can be specified manually by the client, in some embodiments, or they might be generated or implemented by the service, in other embodiments.

To implement this heuristic approach, dependencies among detection mechanisms and/or their security meanings can be considered to define the heuristics for identifying an infection, in some embodiments. This is shown in the following Table 2:

TABLE 2

```
(
    ("Abuse:Device/SYNFlood!DoS" |
        .findings[ ].confidence | max) > 0.8 | |
    ("Anomaly:Device/UnusualOutboundTraffic!Volume" |
        .findings[ ].confidence | max) == 1.0
) && (
    ("ThreatIntel:Device/SuspiciousOutboundConnections!CnCHost" |
        .findings[ ] | count) > 0 | |
    ("Anomaly:Device/UnusualOutboundConnections!GEO" |
        .findings[ ].confidence | max) > 0.8 | |
    ("Anomaly:Device/UnusualOutboundConnections!ASN" |
        .findings[ ].confidence | max) > 0.8
)
```

In this heuristic approach, there may not be a hard dependency on the availability of overall confidences for detection mechanisms, and partial data or limited experimental judgment can instead be used for declaring the heuristics, in some embodiments. However, information about a true positive rate of a detection mechanism can still be considered, if available, in some embodiments. Also, as noted in the example above, the confidence levels that detection mechanisms dynamically generate for their findings can also still be used, in some embodiments. These confidence levels might be based on the detection mechanism's inner decision making process, in some embodiments.

A downside, in some embodiments, of using the heuristic method is the complexity and maintenance of declarations over time. The heuristics and their declaration syntax/language might be routinely reviewed and simplified, in some embodiments. However, for a preliminary detection system with only a few detection mechanisms, this heuristic-based infection declaration method can provide a simple and reliable way of confidence accumulation, in some embodiments. As the detection system evolves and enables more sophisticated detection mechanisms, then more complex models such as decision trees or random forests for determining the relationship between multiple findings from detection mechanisms and infections can instead be used, in other embodiments. Labeled data acquired during the operation of the heuristics method can be accumulated and used for different machine learning technologies to determine what kind of combination of detection mechanisms have to be triggered to produce a finding of malware infection, for example. With decision trees, for example, if two detection mechanisms are triggered then the confidence level might be determined to be higher, and then the labeled data can be used to determine whether or not an infection occurred in previous cases, in some embodiments.

Detection Memory and History

In some embodiments, not necessarily all the detection mechanisms will trigger at the exact same time. Different detection mechanisms might report findings at different points in time, in these embodiments. For example, when a device becomes infected, in the first 5 or 10 minutes the device might connect to a location to download an initial malware payload, which might be a bigger binary or bigger script which allows a bad actor to take control of the device and perform the bad acts that they want to do. After 10 minutes, then the malware might start performing the bad acts, where the bad acts might be bitcoin mining, or denial or service attacks, or using the device as a proxy, as some examples. The bad acts might change over time, in some examples. The infected device might start looking for other victims, for example, and start scanning the network, such as the internal network or external network, or start using specific IP ranges, or start randomly generating IP addresses, in order to search for other victims. Therefore, the various detection mechanisms might be triggered for an extended period of time, in some embodiments.

As another example, using one of the previous examples described above, mechanism (a) may detect a SYN flood at time T1 using time window of Tx and Ty, and mechanism (b) may detect a malware propagation activity at time T2 using time window of Tm and Tn. It is common that some of malware activities coincide at the same time window, but some malware activities may happen at different time windows, depending on the type of malware.

Hence, in order to increase the detection rate, different detection mechanisms might use data from different time windows in order to determine findings and confidence levels of findings. For example detection mechanism (a) might have a time window of 1 hour where it looks at data from the past hour to determine findings and confidence levels for those findings for various edge devices. Additionally, detection mechanism (b) might have a time window of 1 day where it looks at data from the past day to determine findings and confidence levels for those findings for various edge devices. Some detection mechanisms might have the same time window, and some detection mechanisms might have their own time window that is different than the time window of other detection mechanisms. The time window of a detection mechanism might change, such as by clients and/or edge device owners, and/or by using machine-learning techniques, based on feedback, such as whether indications of infected devices produced using the detection mechanism were accurate or false positives.

In addition, recent findings and infection detection confidence of recent findings can be accumulated from multiple recent time slots or windows, in some embodiments. Detection memory can be implemented to include a look-back time window in which all the findings of detection mechanisms are accumulated together, in some embodiments. Multiple different types of detection memory can be used, depending on the embodiment. Some detection memories might only include very recent histories, some might include longer histories, and some might include histories of various lengths in between, depending on the embodiment. Once a detection memory reaches a point where a threshold is established, in some of these embodiments, then a finding can be reported.

There are many different ways or methodologies to accumulate confidences from recent findings, depending on the embodiment. As a first example option, a sliding accumulation time window can be used, in some embodiments. A system that uses this option might accumulate the confidences from all the findings reported during the past look-back time window, in some embodiments. Other embodiments might accumulate only some of the findings reported in the look-back time window. This look-back time window might be configured as 2 hours, for example. Other look-back time windows can be used in other embodiments. This accumulation approach might work well for common infections that are more aggressive and lack detection evasion capabilities.

As a second example option, an expiration time for each finding can be implemented based on its detection mechanism, in some embodiments. With more advanced infections, for example, reported findings may spread across a longer period of time. There might be a gap of one or two days, for example, between the initial infection and observation of an abuse event. The detection mechanisms that would observe these abuse events might have an expiration time of two days, in this example, while other detection mechanisms might have shorter or longer expiration times. Therefore, the different detection mechanisms might have the same or different expiration times for their respective findings, depending on the embodiment. This expiration time example option can also be used as a generalization of the first example option, in some embodiments. The accumulation time window of the first example option might be extended for selected detection mechanisms, if needed, in some embodiments.

In other embodiments, a decay factor can be applied to a finding's confidence levels to gradually decrease its impact in detecting an infection. This decay factor might be applied to the findings of all detection mechanisms, or only to the findings of selected detection mechanisms, depending on the embodiment. If the findings decay over time, then a decay function can be applied to the confidences computed in previous time windows, before those confidences are then used in the computation of a new or current accumulated confidence, for example. In addition to confidence accumulation of recent findings from detection mechanisms, some or all detection mechanisms might also maintain their own internal memory, in some embodiments, such as behavioral profiles, machine learning, or statistical models, depending on the embodiment.

Notifications and Responsive Actions

Using the various embodiments of the malware infection detection service, might lead to various types of client experiences. In some embodiments, a client might receive an alert or a report, or some other notification, saying that a certain edge or IoT device is likely infected by malware. The suspected malware might or might not be identified, depending on the embodiment. The detection mechanisms that triggered the finding might be listed or attached to, or in some other way specified in, the notification, such as the alert or report, in some embodiments. For example, the malware infection detection service might provide to one or more destinations an indication of the detection mechanisms used, the confidence levels for the detection mechanisms, an indication of the findings made by the detection mechanisms, and the confidence levels for the findings, in some embodiments. The client might be able to research the issue further after receiving the notification that specifies the suspected infection, in some embodiments. Some or all of the detection mechanisms might use some form of raw data or metrics to establish their confidences, and/or to trigger a finding of that detection mechanism, in some embodiments. In some embodiments, the malware infection detection service might allow the client to view or analyze the raw data or metrics that were used by the various detection mechanisms.

In some of the same or different embodiments, the malware infection detection service might cause a one or more responsive actions to be taken or initiated. These responsive actions might be in response to identifying one or more edge devices as being infected by malware, in some embodiments. A responsive action can take many forms or types. Some examples of responsive actions are triggering a client-provided function to be executed by, for example, a client-provided function execution service, sending a message to a remote network indicating the one or more infected edge devices, and/or terminating the security credentials, such as security certificates or other credentials, for a particular one or more infected edge devices in the provider network. There are many other kinds of responsive actions that can be taken or initiated by the malware infection detection service, and this list is not intended to be limiting.

Embodiments of a Malware Infection Detection Service

FIG. 1 illustrates an example system environment for malware infection detection for edge devices that comprises a malware infection detection service 104 in a provider network 102, communicating with a plurality of local networks 130, 150, clients and/or edge device owners 170, and/or other data sources 120 through the Internet 114, where the local networks comprise a plurality of edge devices 140*a* . . . 140*n*, 160*a* . . . 160*n* with local data collectors 142*a* . . . 142*n*, 162*a* . . . 162*n*, according to some embodiments.

In some embodiments, a malware infection detection service 104, as well as any number of other possible services, operates as part of a service provider network 102 and each comprise one or more software modules executed by one or more electronic devices at one or more data centers and geographic locations. Client(s) and/or edge device owner(s) 170 using one or more electronic device(s) (which may be part of or separate from the service provider network 102) can interact with the various services of the service provider network 102 via one or more intermediate networks, such as the internet 114. In other examples, external clients or internal clients can interact with the various services programmatically and without user involvement.

A provider network 102 provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks 102 may utilize one or more user accounts that are associated with a client account, though these terms may be used somewhat interchangeably depending upon the context of use. Clients and/or edge device owners may interact with a provider network 102 across one or more intermediate networks 114 (for example, the internet) via one or more interface(s), such as through use of application programming interface (API) calls, via a console implemented as a website or application, etc. The interface(s) may be part of, or serve as a front-end to, a control plane of the provider network 102 that includes "backend" services supporting and enabling the services that may be more directly offered to clients.

To provide these and other computing resource services, provider networks 102 often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service 298, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

In one of the depicted embodiments, the edge devices 140a . . . 140n, 160a . . . 160n are connected to a local network 130, 150 and include a local data collectors 142a . . . 142n, 162a . . . 162n. However, in some embodiments, one or more edge devices might also be directly connected to the Internet 114 using connection 190. In some embodiments, there might not be local networks 130 and 150, and all the edge devices are directly connected to the Internet. In other embodiments some devices, such as edge devices 140a . . . 140n, might be directly connected to the Internet 114 without the use of a local network 130, while other edge devices, such as edge devices 160a . . . 160n, might be connected to a local network 150, which in turn is connected to the Internet 114. In other embodiments the edge devices might be directly connected to a network that includes one or more clients and/or edge device owners. In other embodiments, the edge devices might communicate with the clients and/or edge device owners 170 through the Internet 114. In some embodiments, the edge devices communicate with the provider network 102 through the Internet 114 and/or possibly a local network as well, without ever communicating with any clients or edge device owners. There are many embodiments regarding the setup of edge devices with regard to the Internet, the provider network, and/or the client(s) and/or edge device owners, and the above description should not be construed as being limiting.

The provider network 102 includes a malware infection detection service 104 for malware infection detection for edge devices. One or more of the edge devices 140a . . . 140n, 160a . . . 160n may collect data from a respective data collector 142a . . . 142n, 162a . . . 162n and send the data to the provider network 102, such as via the local network 130, 150 and the network 114. For example, the edge device 140n may collect and send the data 138n to the provider network 102 using connection 190, and the edge device 140a may collect and send the data 138a to the provider network 102 through local network 130. In other embodiments, edge devices might send data to an edge devices monitor 132 152, either by request or not by request, and the edge devices monitor 132 152 might collect the data, and send the data and/or summaries, abstractions, statistics, and/or analytics regarding the data to a malware infection detection service 104. In other embodiments, some or all of the edge devices, such as edge devices 140n and 160a, might send data to the provider network 102 through a direct connection 190 to the Internet. In other embodiments, edge devices 140a . . . 140n, 160a . . . 160n may collect data from a respective data collector 142a . . . 142n, 162a . . . 162n and send some or all of the data to a client and/or edge device owner 170. The client and/or edge device owner 170 might include an edge devices monitor component 172 to request and/or collect the data from the edge devices. The client and/or edge device owner 170 might be connected to the Internet 114, or might be a part of the local network 130, 150 depending on the embodiment. In other embodiments, an edge device might send some or all of the data to the client and/or edge device owner 170, and might send the same or different data to the provider network 102.

In some embodiments, malware infection detection service 104 of the provider network 102 may receive the data 138 from one or more of the edge devices 140, 160. For example, the malware infection detection service 104 may receive the data 138a and data 138n. The malware infection detection service 104 might also receive data from an edge devices monitor 132, 152 of a local network 130, 150, and/or from an edge devices monitor 172 of a client and/or edge device owner 170. The edge devices monitor 132, 152 might not only receive data directly from edge devices but might also monitor network activity of edge devices on a network level to determine data regarding the edge devices. The malware infection detection service 104, or another service of the provider network 102, might monitor edge device communication with the provider network, or edge device lack of communication with the provider network, to determine data about one or more edge devices. Such data can then be sent to and/or used by the malware infection detection service 104. The malware infection detection service 104 might also receive data, such as global data, from other data sources 120, such as honeypots. A malware honeypot, for example, can be used to detect malware by exploiting the known replication and attack vectors of malware. The malware infection detection service 104 can receive data regarding malware from honeypots and/or other data sources. These other data sources 120 can also include threat intelligence data, from, for example, threat intelligence sources that actively track malware and botnets and publish their indicators in the form of threat intelligence feeds.

The malware infection detection service 104 may then analyze the received data. The malware infection detection service 104 may then generate indications of infected edge devices to the local network 130, such as the edge devices monitor 132 of the local network, based on the analysis of the data 138*a* . . . 138*n* and generate indications of infected edge devices to the local network 150, such as the edge devices monitor 152 of the local network, based on the analysis of the data 158*a* . . . 158*n*. The malware infection detection service 104 can in addition, or instead, generate indications of infected edge devices to client(s) and/or edge device owner(s) 170.

In embodiments, the edge device 140*a* . . . 140*n*, 160*a* . . . 160*n* may send the data received from the data collector 142*a* . . . 142*n*, 162*a* . . . 162*n* to the malware infection detection service 104 through the local networks 130, 150 possibly using the edge devices monitor 132, 152. The local networks 130, 150 may then receive indications of infected edge devices from the malware infection detection service 104, wherein the indications of infected edge devices is based on the data received from the data collector 142*a* . . . 142*n*, 162*a* . . . 162*n*.

In embodiments, the malware infection detection service 104 receives data, such as global data, from other data sources 120, wherein the global data might be based on data collected by one or more other edge devices of one or more other remote edge devices. As explained previously, the other data sources 120 might be from sources such as honeypots. A malware honeypot, for example, can be used to detect malware by exploiting the known replication and attack vectors of malware. These other data sources 120 can also include threat intelligence data, from, for example, threat intelligence sources that actively track malware and botnets and publish their indicators in the form of threat intelligence feeds. There are many other kinds of other data sources 120 that the malware infection detection service 104 can receive data from, and the above descriptions should not be considered to be limiting. The malware infection detection service 104 may then analyze the data, such as the global data, and generate indications of infected edge devices based on the analysis of the data.

In some embodiments, the indications of infected edge devices received from malware infection detection service 104 is based on the data received from the local data collectors 142*a* . . . 142*n*, 162*a* . . . 162*n* and global data. The indications of infected edge devices can also be based on data received from an edge devices monitor 132, 152, 172. The edge devices monitor might receive data from edge devices, or might monitor network activity, or lack of network activity, of edge devices to determine data about one or more edge devices. For example, edge device communication, or lack of communication, with the local network and/or the provider network can be monitored. The indications of infected edge devices can also be based on data received from another service of the provider network, or determined by the malware infection diction service itself. This data can be, for example, data determined from edge device communication, or lack of communication, with provider network. As one example, the malware infection detection service 104 may generate the indications of infected edge devices based on the data received from one or more of the local data collectors 142*a* . . . 142*n*, 162*a* . . . 162*n*, and global data of one or more other data sources 120. In some embodiments, the malware infection detection service 104 may generate a indications of infected edge devices based on topology data or any other data received from a corresponding edge device that will be monitored.

In some embodiments, the malware infection detection service 104 may apply different weights to at least some of the received data during the analysis of the received data. For example, a higher weight may be applied to the received data from the local network than to the global data during the analysis of the received data. Thus, an amount of data received by the malware infection detection service 104 from the local network may have a larger impact on the indications of infected edge devices than the same amount of global data received by the malware infection detection service 104.

Conversely, in some embodiments, a higher weight may be applied to the global data than to the received data from the local network during the analysis of the received data and the analysis of the global data. Thus, an amount of global data received by the malware infection detection service 104 may have a larger impact on the indications of infected edge devices than the same amount of data received by the malware infection detection service 104 from the local network.

In various embodiments, analysis of data from two or more different edge devices may be used to generate an indication of an infected edge device of a particular edge device. Thus, one indication of an infected edge device of a particular edge device may be indicated not only based on data from the particular edge device, but also based on data from one or more other edge devices of the same local network and/or other networks. In other words, the generating of at least one of the indications of infected edge devices may be based on analysis of a portion of the data received by the malware infection detection service 104 from two or more different edge devices. The indications of infected edge devices can also be based on data received from an edge devices monitor 132, 152, 172. The edge devices monitor might receive data from edge devices, or might monitor network activity, such as local network activity, or lack of network activity, of edge devices to determine data about one or more edge devices. For example, edge device communication, or lack of communication, with the local network and/or the provider network can be monitored. The indications of infected edge devices can also be based on data received from another service of the provider network, or determined by the malware infection diction service itself. This data can be, for example, data determined from edge device communication, or lack of communication, with provider network. As explained more fully previously, the indications of infected edge devices can also be based on other data sources 120, such as global data.

In some embodiments, the malware infection detection service 104 may indicate infected edge devices to one or more respective local networks 130, 150 or to clients and/or edge device owners 170 on a periodic basis and/or in response to a triggering event. For example, indications may be generated based on received data and communicated to local networks, edge device monitors, clients, and/or edge devices on an hourly, daily, or weekly basis, or in response to the malware infection detection service 104 receiving a command to provide indications of infections of respective edge devices, or based on the identification of an infection by one or more edge devices by the malware infection detection service 104.

Figure 2:
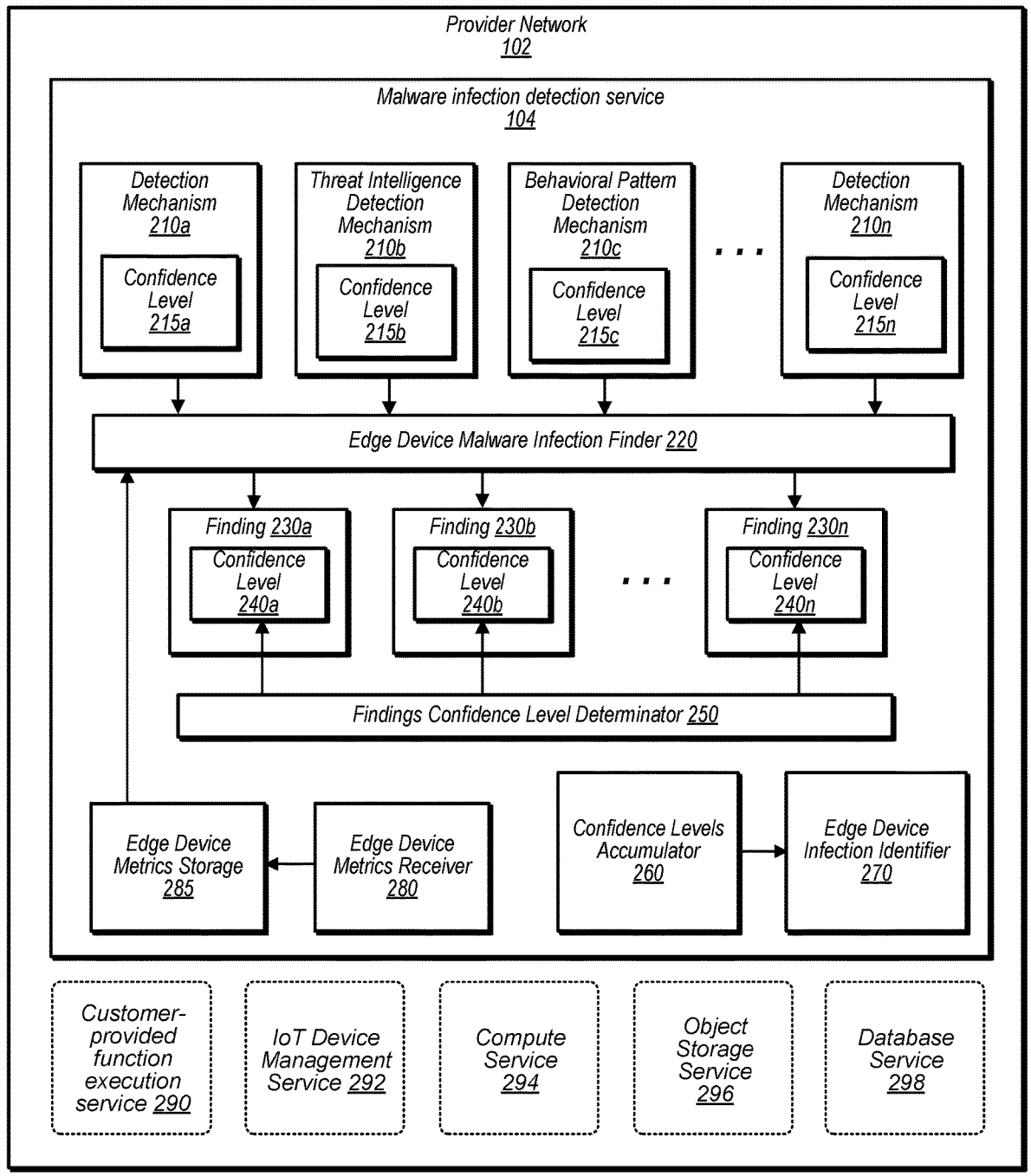
FIG. 2 illustrates further aspects of the example system for malware infection detection for edge devices, where a malware infection detection service of a provider network comprises a plurality of detection mechanisms with confidence levels, an edge device malware infection finder that determines findings, a findings confidence level determinator that determines confidence levels for the findings, edge device metrics receiver that receives metrics from edge devices and stores them in an edge device metrics storage, a confidence levels accumulator, and an edge device infection identifier, according to some embodiments.

FIG. 2 illustrates further aspects of the example system for malware infection detection for edge devices, where a malware infection detection service 104 of a provider network 102 comprises a plurality of detection mechanisms 210a . . . 210n with corresponding confidence levels 215a . . . 215n, an edge device malware infection finder 220 that determines findings 230a . . . 230n, a findings confidence level determinator 250 that determines confidence levels 240a . . . 240n for the findings 230a . . . 230n, edge device metrics receiver 280 that receives metrics from edge devices and stores them in an edge device metrics storage 285, a confidence levels accumulator 250, and an edge device infection identifier 270, according to some embodiments.

The malware infection detection service uses various detection mechanisms 210a . . . 210n to detect infections. These detection mechanisms can be threat-intelligence detection mechanisms 210b, or behavioral pattern detection mechanisms 210c, or other kinds of detection mechanisms 210a, 210n. Each of the detection mechanisms is assigned a corresponding confidence level 215a . . . 215n. This can be a pre-programmed confidence level, or can be assigned by the provider network, a client of the provider network, the administrator or owner of a local network, or by the malware infection detection service itself. The confidence level might be updated, such as by using machine-learning techniques, based on feedback, such as whether indications of infected devices produced using the detection mechanism were accurate or false positives.

The overall confidence 215a . . . 215n of each detection mechanism 210a . . . 210n can be calculated based on its accuracy measurement tests, in some embodiments. In some of these embodiments, a detection mechanisms' accuracy can be measured from its true positive detection rate in successfully identifying infections or their indications in a large sample set of clean and infected devices with relevant indications. To ensure continuous detection accuracy, these test runs can be repeated regularly, in some of these embodiments, with the emergence of new types of infection and/or on-boarding of new clients or types of devices.

The edge device malware infection finder 220 uses one or more detection mechanisms 210a . . . 210n, and data received from the edge devices to determine various findings of infection 230a . . . 230n. The data received from edge devices might be received by an edge device metrics receiver 280 and stored in edge device metrics storage 285. The edge device metrics storage 285 might use a database service 298, or an object storage service 296, of the provider network 102 to store the edge device metrics. The metrics might be gathered by an IoT Device Management service 292 of the provider network 104, in some embodiments. Each finding of infection 230a . . . 230n can have a confidence level 240a . . . 240n determined by a findings confidence level determinator 250, in some embodiments.

Each detection mechanism can include related evidence for any of its reported findings. The determination of a confidence level 240a . . . 240n for reported findings 230a . . . 230n can be calculated for the finding by the findings confidence level determinator 250 based on the detection mechanism's internals, in some embodiments. A per-finding confidence level 240a . . . 240n is different than a mechanism's fixed overall confidence 215a . . . 215n. The metadata and evidence associated with a finding 230a . . . 230n depends on its detection mechanism 210a . . . 210n used, but it might also include high-level information to express the factors involved in its decision making process, in some embodiments. The metadata and evidence associated with a reported finding 230a . . . 230n can be used to determine the confidence level 240a . . . 240n for the finding by the findings confidence level determinator 250.

The malware infection detection service 104 also can include a confidence levels accumulator 250 and an edge device infection identifier 270. Using the confidence-based approach, individual detection mechanisms 210a . . . 210n may not always, or ever, reach or pass a threshold to report an infection based on their own confidences. Therefore the results of each of the detection mechanisms can be combined by the confidence levels accumulator 250 in order for the edge device infection identifier 270 to determine whether a threshold to report an infection has been reached. This threshold might be configured by the client, or by the service, and/or might be modified based on feedback, such as by machine-learning techniques, depending on the embodiment.

In order to avoid losing the information from these lower-confidence mechanisms or their lower-confidence specific findings, an accumulative approach can be used in combining the findings 230a . . . 230n, the confidence levels of the findings 240a . . . 240n, and/or the confidence levels 215a . . . 215n of the detection mechanisms used by the confidence levels accumulator 250 from the individual detection mechanisms. Then, the accumulated confidence accumulated by the confidence levels accumulator 250 can be used to decide about reporting an infection by the edge device infection identifier 270.

Some embodiments of the malware infection detection service require at least two detection mechanisms for an identification of a malware infection. The findings of the detection mechanisms can be accumulated by the confidence levels accumulator 250 to make a final determination by the edge device infection identifier 270 whether a device or devices are infected. Many detection mechanisms detect anomalies independently or in isolation from each other. By putting multiple of these detection mechanisms together, one can establish a higher level of confidence that a device or devices are infected, whereas each individual detection mechanism might not be sufficient to detect an infection on its own.

Figure 3:
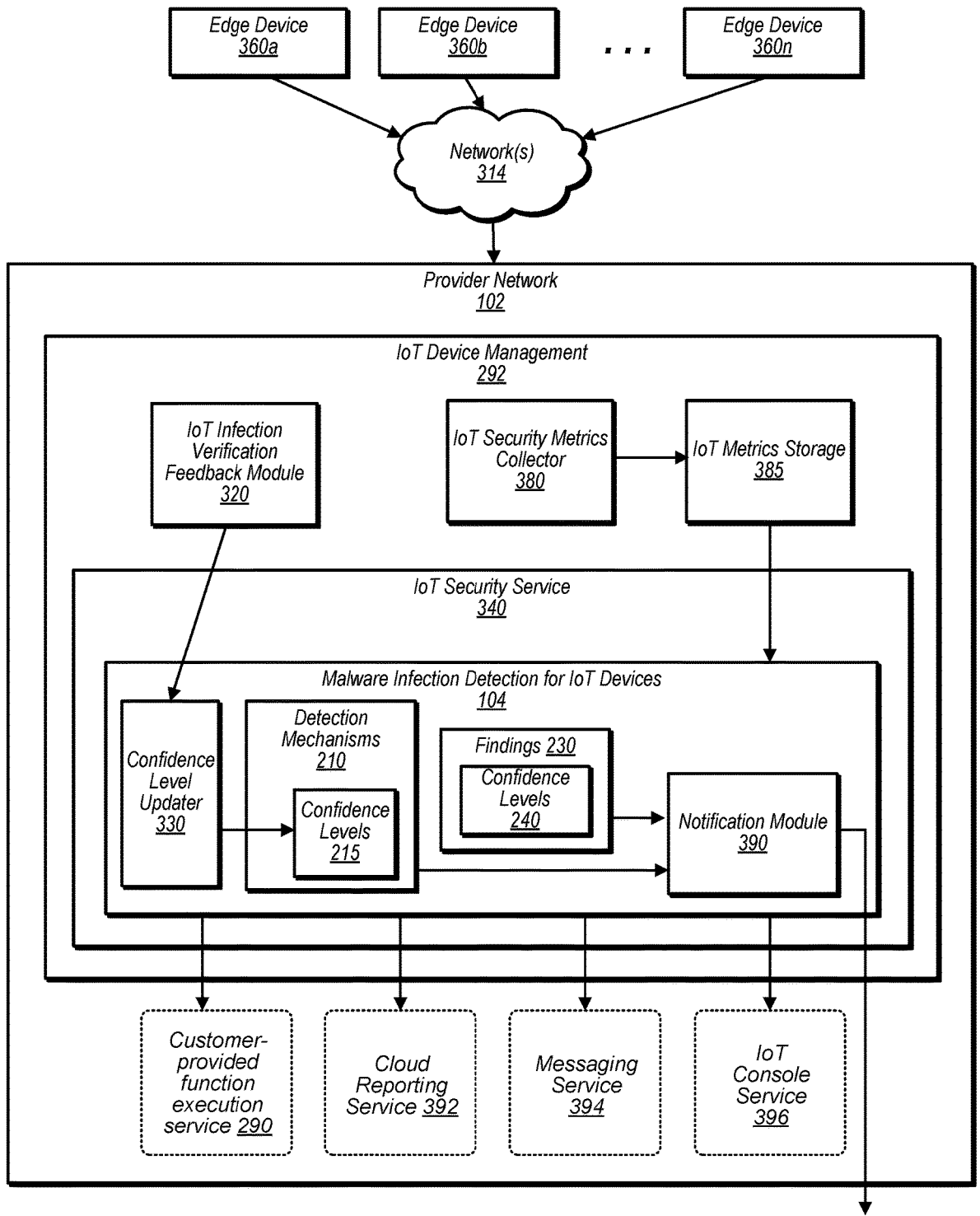
FIG. 3 illustrates further aspects of the example system for malware infection detection for IoT devices, where the malware infection detection service is part of IoT security service, which is part of IoT device management, which is part of the provider network, and where the malware infection detection service further comprises a confidence level updater and a notification module, and where it communicates with various communication services of the provider network, according to some embodiments.

FIG. 3 illustrates further aspects of the example system for malware infection detection for IoT devices, where the malware infection detection service 104 is part of IoT security service 340, which is part of IoT device management 292, which is part of the provider network 102. The malware infection detection service 104 further comprises a confidence level updater 330 that updates confidence levels 215 of detection mechanisms 210. If the edge device infection identifier 270 identifies one or more edge devices as infected, then a notification module can use findings 230 and confidence levels of the findings 230 and/or the detection mechanisms used 210, and the confidence levels of those detection mechanisms 240 to notify one or more destinations. If the edge device infection identifier 270 identifies one or more edge devices as infected, then the malware infection detection module 104 might communicate with different services of the provider network 102 in order to communicate the infection. These services can include a client-provided function execution service 290 that executes client-provided functions when triggered to do so. These services can also include a cloud reporting service 392 that reports network and device status to a provider network's clients, such as system administrators. These services can also include a messaging service 394 that provides messages or emails to certain defined persons or accounts. These services can also include an IoT Console service that provides communication to an IoT's console.

In some embodiments, a client of the provider network might receive an alert or a report, or some other notification from the notification module 390, saying that a certain edge or IoT device is likely infected by malware. The suspected malware might or might not be identified, depending on the embodiment. The detection mechanisms that triggered the finding might be listed or attached to, or in some other way specified in, the notification, such as the alert or report, in some embodiments. For example, the notification module 390 might provide to one or more destinations an indication of the detection mechanisms used, the confidence levels for the detection mechanisms, an indication of the findings made by the detection mechanisms, and/or the confidence levels for the findings, in some embodiments. The client might be able to research the issue further after receiving the notification that specifies the suspected infection, in some embodiments. Some or all of the detection mechanisms 210 might use some form of raw data or metrics, potentially from the IoT metrics storage 385 where the metrics were received by the IoT security metrics collector 380 from edge devices 360$a$ ... 360$n$ via the network 314, to establish their confidences, and/or to trigger a finding of that detection mechanism, in some embodiments. In some embodiments, the malware infection detection service might allow the client to view or analyze the raw data or metrics that were used by the various detection mechanisms.

In some of the same or different embodiments, the malware infection detection service 104 might cause a one or more responsive actions to be taken or initiated. These responsive actions might be in response to identifying one or more edge devices as being infected by malware, in some embodiments. A responsive action can take many forms or types. Some examples of responsive actions are triggering a client-provided function to be executed by, for example, a client-provided function execution service 290, sending a message to a remote network indicating the one or more infected edge devices by the cloud reporting service 392, or the messaging service 394, or the IoT console service 396, for example, and/or terminating the credentials, such as security certificates or other security credentials, for a particular one or more infected edge devices in the provider network. There are many other kinds of responsive actions that can be taken or initiated by the malware infection detection service, and this list is not intended to be limiting.

An IoT infection verification feedback module 320 might be part of the IoT Device Management service 292, or potentially part of another service or layer, depending on the embodiment. Each of the detection mechanisms 210 is assigned a corresponding confidence level 215. This can be a pre-programmed confidence level, or can be assigned by the provider network, a client of the provider network, the administrator or owner of a local network, or by the malware infection detection service itself. The confidence level might then be updated by a confidence level updater 330, such as by using machine-learning techniques, based on feedback provided by the IoT infection verification feedback module 320. This feedback can include, for example, whether indications of infected devices that were determined using a particular detection mechanism were accurate indications or false positives. If they were accurate, then the confidence level of that detection mechanism might be increased. If the indications of infection were false positives, then the confidence level of that detection mechanism might be decreased, in some embodiments.

Figure 4:
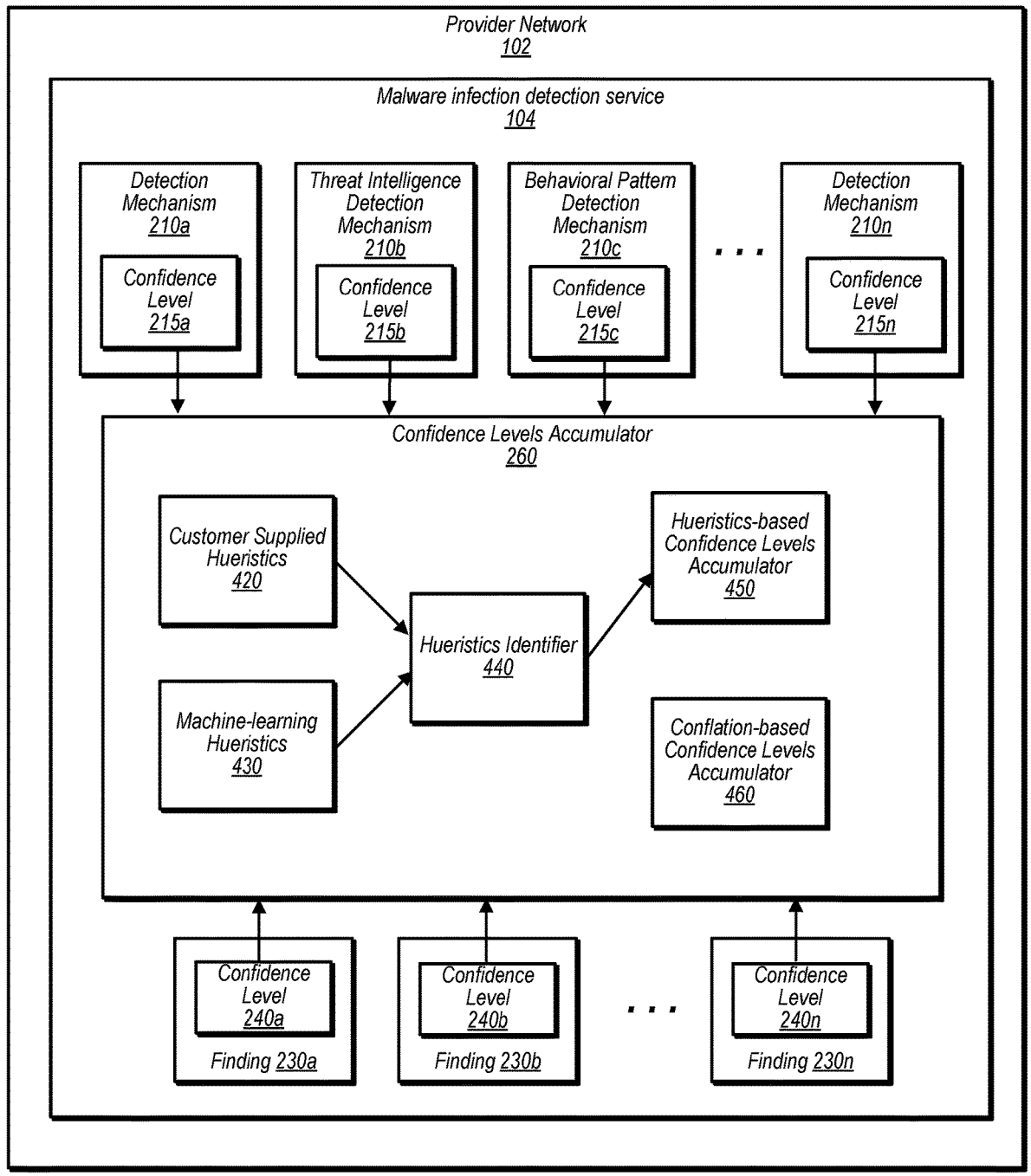
FIG. 4 illustrates further aspects of a confidence levels accumulator of a malware infection detection service of a provider network, where the confidence levels accumulator receives confidence levels of detection mechanisms and confidence levels of findings, and comprises a heuristics-based confidence levels accumulator and a conflation-based confidence levels accumulator, according to some embodiments.

FIG. 4 illustrates further aspects of a confidence levels accumulator 260 of a malware infection detection service 104 of a provider network 102, where the confidence levels accumulator 260 receives confidence levels 215$a$ ... 215$n$ of detection mechanisms 210$a$ ... 210$n$, and confidence levels 240$a$ ... 240$n$ of findings 230$a$ ... 230$n$. The confidence levels accumulator can comprise a heuristics-based confidence levels accumulator 460 and/or a conflation-based confidence levels accumulator 460, depending on the embodiment.

There are many different methods or algorithms that can be used in combining the findings from individual detection mechanisms into an accumulated confidence. One method can be "conflation" that calculates probabilities from multiple events that have their own probabilities into one single probability. The conflated/accumulated confidence of the detection mechanisms can be calculated by the conflation-based confidence levels accumulator 460, and once calculated it can be compared to the a reporting threshold to determine that the accumulated confidence passes the set threshold.

When using the conflation method to combine the findings from individual detection mechanisms into an accumulated confidence, the method works optimally when the probabilities of the findings from the individual detection mechanisms are independent from each other. Using the conflation confidence accumulation method, it is best to ensure that the detection mechanisms are independent from each other and do not cause confidence exaggeration. If there are two different detection mechanisms that have some form of overlap, for example, based on their underlying cause, then the conflation formula will not be as accurate.

A malware infection detection service 104 might use a heuristic approach in accumulating confidence of individual detection mechanisms by a heuristics-based confidence levels accumulator 450. Combination formulas can be created, in some embodiments. These combination formulas might be created when it cannot be guaranteed that detection mechanisms are independent from each other, in some of these embodiments. These combination formulas can specify, for example, that if one detection mechanism triggers confidences at a certain level, that this affects another detection mechanism. The combination formulas can specify a combination of different detection mechanisms that are needed, or a total number of findings from all detection mechanisms that are needed, depending on the embodiment. Combination formulas and/or other heuristics can be specified manually by the client in customer supplied heuristics 420, in some embodiments, or they might be generated or implemented by the service, for example, in machine learning heuristics 430, in other embodiments. A heuristics identifier 440 can identify which heuristics to apply based on which detection mechanisms 210$a$ ... 210$n$ were triggered in the potential identification of malware on an edge device.

To implement this heuristic approach, dependencies among detection mechanisms and/or their security meanings can be considered when defining the heuristics for identifying an infection, in some embodiments. In this heuristic approach, there may not be a hard dependency on the availability of overall confidences for detection mechanisms, and partial data or limited experimental judgment can instead be used for declaring the heuristics, in some embodiments. However, information about a confidence level 215$a$ ... 215$n$ of a detection mechanism 210$a$ ... 210$n$ can still be considered, if available, in some embodiments. Also, as noted in the example above, the confidence levels 240*a* . . . 240*n* that detection mechanisms can dynamically generate for their findings 230*a* . . . 230*n* can also still be used, in some embodiments. These confidence levels might be based on the detection mechanism's inner decision making process, in some embodiments.

A downside, in some embodiments, of using the heuristic method is the complexity and maintenance of declarations over time. The heuristics and their declaration syntax/language might be routinely reviewed and simplified, in some embodiments. However, for a preliminary detection system with only a few detection mechanisms, this heuristic-based infection declaration method can provide a simple and reliable way of confidence accumulation, in some embodiments. As the detection system evolves and enables more sophisticated detection mechanisms, then more complex models such as decision trees or random forests for determining the relationship between multiple findings from detection mechanisms and infections can instead be used, in other embodiments. Labeled data acquired during the operation of the heuristics method can be accumulated and used for different machine learning technologies to determine what kind of combination of detection mechanisms have to be triggered to produce a finding of malware infection, for example. With decision trees, for example, if two detection mechanisms are triggered then the confidence level might be determined to be higher, and then the labeled data can be used to determine whether or not an infection occurred in previous cases, in some embodiments.

Figure 5:
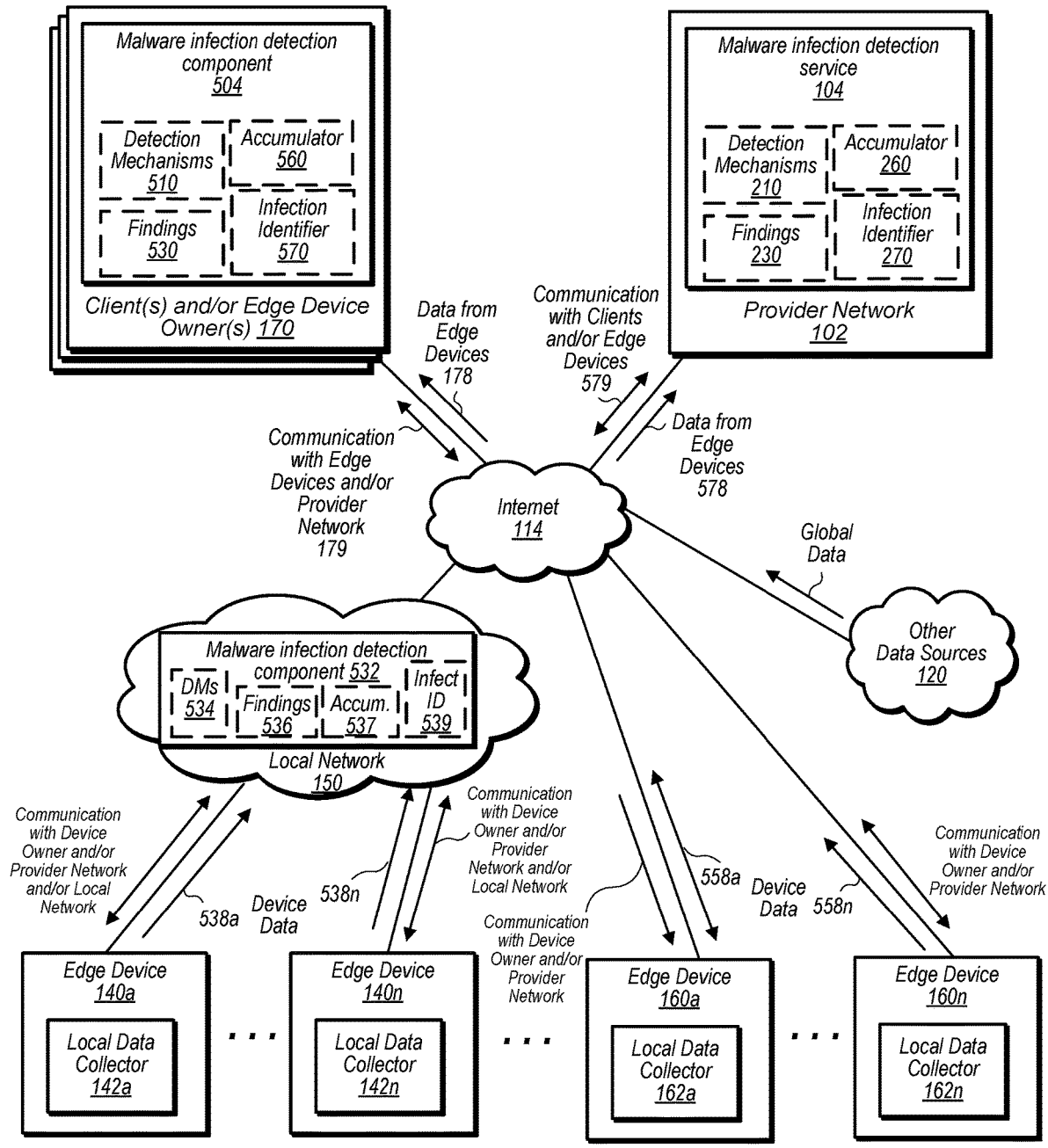
FIG. 5 illustrates an example system environment for malware infection detection for edge devices where some or all of the malware infection detection can occur at a client and/or edge device owner's computing devices, or at a local network, where the system comprises some or all of the malware infection detection service in a provider network, and some or all of the malware infection detection components in the client and/or edge device owner's computing devices, and some or all of the malware infection detection in a local network, where the different components of the malware infection detection communicate with a plurality of edge devices, with local data collectors, and/or with other data sources through the Internet, according to some embodiments.

FIG. 5 illustrates an example system environment for malware infection detection for edge devices where some or all of the malware infection detection can occur at a client and/or edge device owner's computing devices, or at a local network, where the system comprises some or all of the malware infection detection service in a provider network, and some or all of the malware infection detection components in the client and/or edge device owner's computing devices, and some or all of the malware infection detection in a local network, where the different components of the malware infection detection communicate with a plurality of edge devices, with local data collectors, and/or with other data sources through the Internet, according to some embodiments.

In some embodiments, a malware infection detection service 104, as well as any number of other possible services, operates as part of a service provider network 102 and each comprise one or more software modules executed by one or more electronic devices at one or more data centers and geographic locations. However, in other embodiments, some or all of the functionality of the malware infection detection service can operate as a malware infection detection component 504 of a computing device of a client and/or edge device owner 170, and/or can operate as a malware infection detection component 532 of a computing device in a local network 150. In some embodiments, detection mechanisms can be in multiple locations, and the detection mechanisms might produce findings and confidence levels for those findings that can then be communicated to a centralized accumulator and/or infection identifier. There are many different embodiments including many different topologies and architectures for malware infection detection, and the descriptions for FIG. 5 should not be construed as limiting.

In one of the depicted embodiments, the edge devices 140*a* . . . 140*n* are connected to a local network 130 and include local data collectors 142*a* . . . 142*n*. Edge devices 160*a* . . . 160*n* are connected to the Internet 114, and include local data collectors 162*a* . . . 162*n*. In other embodiments a local network might also include one or more clients and/or edge device owners. Edge devices 140*a* . . . 140*n* might communicate with a malware infection detection component 532 of the local network 150. The edge devices 140*a* . . . 140*n*, 160*a* . . . 160*n* might communicate with a malware infection detection component 504 on a computing device of a client and/or edge device owner 170 through the Internet 114. The edge devices might in addition to, or instead of, communicate with a malware infection detection service 104 (that can also be called a malware infection detection component) of a provider network 102 through the Internet 114 and/or possibly a local network 150 as well.

The provider network 102 can include a malware infection detection service (or component) 104 for malware infection detection for edge devices. The local network 150 can also include a malware infection detection component 532 for malware infection detection of edge devices. Computing devices of the client(s) and/or edge device owners(s) can also include a malware infection detection component 504 for malware infection detection of edge devices. Each of the malware infection detection service (or component) 104, the malware infection detection component 532, and the malware infection detection component 504 can include some or all of the functionality for malware infection detection. One or more of the edge devices 140*a* . . . 140*n*, 160*a* . . . 160*n* may collect data from a respective data collector 142*a* . . . 142*n*, 162*a* . . . 162*n* and send the data to any, some, or all of the malware infection detection components 104, 504, and 532. For example, the edge device 140*n* may collect and send the data 538*n* to the malware infection detection component 532 of the local network 150 and/or the malware infection detection component 504 of the computing devices of clients and/or edge device owners 170, and/or the malware infection detection service 104 of the provider network 102. Edge device 140*n* might send each of the malware infection detection components 104, 504, 532 the same data, or it might send each different data, or it might send some of the same data and some different data to the various malware infection detection components 104, 504, 532. Edge device 140*n* might send its data to some, none, or all of the malware infection detection components 104, 504, 532.

In some embodiments, the malware infection detection components 104, 504, 532 may receive the data 538, 558 from one or more of the edge devices 140, 160. For example, the malware infection detection components 104, 504, 532 may receive the data 538*a* and data 538*n*. The malware infection detection components 104, 504, 532 might also receive data from an edge devices monitor 132, 152 (shown in FIG. 1) of a local network 130, 150, and/or from an edge devices monitor 172 (shown in FIG. 1) of a client and/or edge device owner 170. The edge devices monitors 132, 152, 172 might not only receive data directly from edge devices but might also monitor network activity of edge devices on a network level to determine data regarding the edge devices. The malware infection detection components 104, 504, 532, might monitor edge device communication, or edge device lack of communication, to determine data about one or more edge devices. Such data can then be sent to and/or used by the malware infection detection components 104, 504, 532. The malware infection detection components 104, 504, 532 might receive data, such as global data, from other data sources 120, such as malware honeypots. A malware honeypot, for example, can be used to detect malware by exploiting the known replication and attack vectors of malware. The malware infection detection components 104, 504, 532 can receive data regarding malware from the honeypots and/or other data sources. These other data sources 120 can also include threat intelligence data, from, for example, threat intelligence sources that actively track malware and botnets and publish their indicators in the form of threat intelligence feeds.

Each of the malware infection detection components 104, 504, 532 can comprise a plurality of detection mechanisms 210, 510, 534 respectively, with corresponding confidence levels (not shown), an edge device malware infection finder (not shown) that determines findings 230, 530, 536 respectively, a findings confidence level determinator (not shown) that determines confidence levels for the findings 230, 530, 536 respectively, an edge device metrics receiver (not shown) that receives metrics from edge devices and stores them in an edge device metrics storage (not shown), a confidence levels accumulator 260, 560, 537 respectively, and an edge device infection identifier 270, 570, 530 respectively, according to some embodiments Each of the malware infection detection components 104, 504, 532 can use various detection mechanisms 210, 510, 534 to detect infections. These detection mechanisms can be threat-intelligence detection mechanisms, or behavioral pattern detection mechanisms, or other kinds of detection mechanisms. Each of the detection mechanisms 210, 510, 534 is assigned a corresponding confidence level. This can be a pre-programmed confidence level, or can be assigned by the provider network, a client of the provider network, the administrator or owner of a local network, the owner of the edge devices, or by the malware infection detection service itself. The confidence level might be updated, such as by using machine-learning techniques, based on feedback, such as whether indications of infected devices produced using the detection mechanism were accurate or false positives.

Each of the malware infection detection components 104, 504, 532 can include an edge device malware infection finder that uses one or more detection mechanisms 210, 510, 534, and data received from the edge devices to determine various findings of infection 230, 530, 536. The data received from edge devices might be received by an edge device metrics receiver and stored in edge device metrics storage. Each finding of infection 230, 530, 536 can have a confidence level determined by a findings confidence level determinator, in some embodiments. Each of the detection mechanism 210, 510, 534 can include related evidence for any of its reported findings. The determination of a confidence level for reported findings 230, 530, 536 can be calculated for the finding by the findings confidence level determinator based on the detection mechanism's internals, in some embodiments. A per-finding confidence level is different than a mechanism's fixed overall confidence.

Each of the malware infection detection components 104, 504, 532 can also include a confidence levels accumulator 260, 560, 537 and an edge device infection identifier 270, 570, 539. Using the confidence-based approach, individual detection mechanisms 210, 510, 534 may not always, or ever, reach or pass a threshold to report an infection based on their own confidences. Therefore the results of each of the detection mechanisms can be combined by the confidence levels accumulator 260, 560, 537 in order for the edge device infection identifier 270, 570, 539 to determine whether a threshold to report an infection has been reached. This threshold might be configured by the client, or by the service, and/or might be modified based on feedback, such as by machine-learning techniques, depending on the embodiment.

In order to avoid losing the information from these lower-confidence mechanisms or their lower-confidence specific findings, an accumulative approach can be used in combining the findings 230, 530, 536, the confidence levels of the findings, and/or the confidence levels of the detection mechanisms used. Then, the accumulated confidence accumulated by the confidence levels accumulator 260, 560, 537 can be used to decide about reporting an infection by the edge device infection identifier 270, 570, 539.

While some embodiments might include multiple accumulators 260, 560, 537 and/or infection identifiers 270, 570, 539 at the various malware infection detection components 104, 504, 532, other embodiments might only include a single accumulator and infection identifier that accumulates the finding of infection 230, 530, 536 from the various malware infection detection components 104, 504, 532 into a single accumulated confidence for one or more edge devices. This single accumulator and/or infection identifier can be located in the malware infection detection service 104 of the provider network 102 (as accumulator 260 and infection identifier 270), or can be located in the malware infection detection component 504 of a client and/or edge device owner 170 (as accumulator 560 and infection identifier 570), or can be located in the malware infection detection component 532 of a local network 150 (as accumulator 537 and infection identifier 539). This single accumulator and infection identifier for the system can perform the functionality of the confidence levels accumulator 260 and edge devices infection identifier 270 that is described in FIGS. 2-4. For example, this single accumulator can combine the findings 230, 530, 536, and the confidence levels of the findings, and/or the confidence levels of the detection mechanisms used received from the other malware infection detection components into an accumulated confidence either per edge device, or per edge device group. This accumulated confidence can then be used by the infection identifier to identify infections. A notification module on each or any of the malware infection detection components 104, 504, 532 can notify about infections, as described for notification module 390 in FIG. 3.

As an example, some embodiments of the malware infection detection require at least two detection mechanisms for an identification of a malware infection. The findings 230, 530, 536 of the detection mechanisms 210, 510, 534 from the various malware infection detection components 104, 504, 532 can be accumulated by a single confidence levels accumulator 260 of the malware infection detection service 104 of the provider network 102 to make a final determination by the edge device infection identifier 270 of the malware infection detection service 104 of the provider network 102 whether a device or devices are infected. Many detection mechanisms 210, 510, 534 detect anomalies independently or in isolation from each other. By putting multiple of these detection mechanisms 210, 510, 534 together, one can establish a higher level of confidence that a device or devices are infected, whereas each individual detection mechanism might not be sufficient to detect an infection on its own.

Illustrative Methods of Malware Infection Detection of Edge Devices

Figure 6:
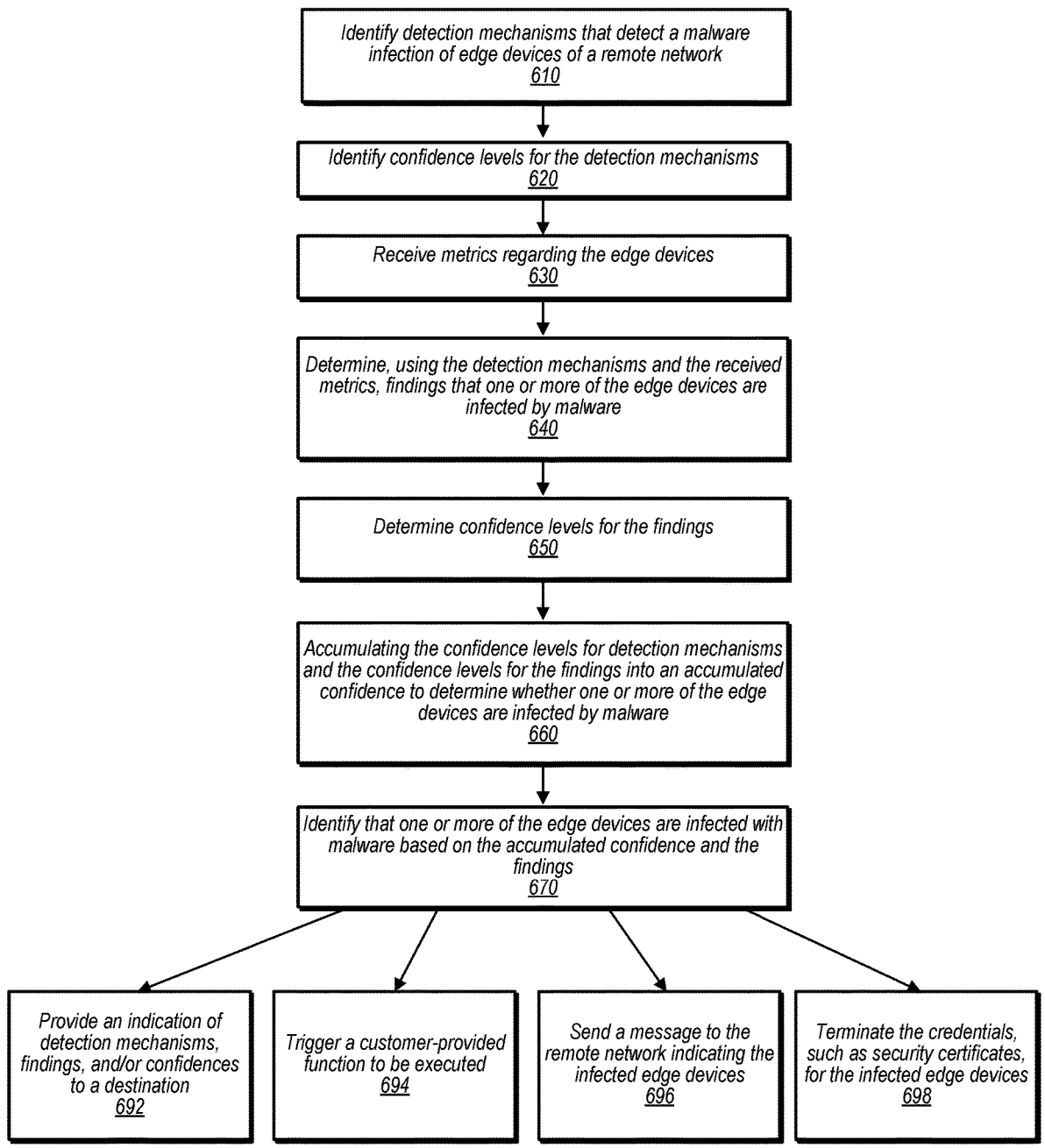
FIG. 6 is a flowchart of an illustrative method implemented by a malware infection detection service of a provider network, where the malware infection detection service identifies detection mechanisms and confidence levels for the detection mechanisms, receives metrics from edge devices, determines findings that edge device(s) are infected by malware and confidence levels for the findings, accumulates the confidence levels, identifies an edge device as detected by malware, and potentially performs some type of communication or action, according to some embodiments.

FIG. 6 is a flowchart of an illustrative method implemented by a malware infection detection service of a provider network, where the malware infection detection service identifies detection mechanisms and confidence levels for the detection mechanisms, receives metrics from edge devices, determines findings that edge device(s) are infected by malware and confidence levels for the findings, accumulates the confidence levels, identifies an edge device as detected by malware, and potentially performs some type of communication or action, according to some embodiments.

FIG. 6 begins by identifying detection mechanisms that detect a malware infection of edge devices of a remote network in block 610. Then the method identifies confidence levels for the detection mechanisms in block 620. Either before, after, or during the execution of blocks 610 and 620, the method can receive metrics regarding the edge devices in block 630. The method determines, using the detection mechanisms and the received metrics, findings that one or more of the edge devices are infected by malware in block 640. The method determines confidence levels for the findings in block 650. Then, the method accumulates the confidence levels for detection mechanisms and/or the confidence levels for the findings into an accumulated confidence to determine whether one or more of the edge devices are infected by malware in block 660. The method identifies that one or more of the edge devices are infected with malware based on the accumulated confidence and the findings in block 670.

After the method identifies that one or more of the edge devices are infected with malware, then it can take one or more actions, or no actions, depending on the embodiment. The method can provide an indication of detection mechanisms, findings, and/or confidences to a destination in block 692. The method might trigger a client-provided function to be executed in block 694. The method might send a message to the remote network indicating the infected edge devices in block 696. The method might terminate the credentials, such as the security certificates or other security credentials, for the infected edge devices in block 698. The method might implement one or more of these blocks, or some different type of communication or action not listed here, depending on the embodiment. These action blocks 692-698 are not intended to be limiting, as other actions might be taken either instead of or in conjunction with one or more of these actions.

Figure 7:
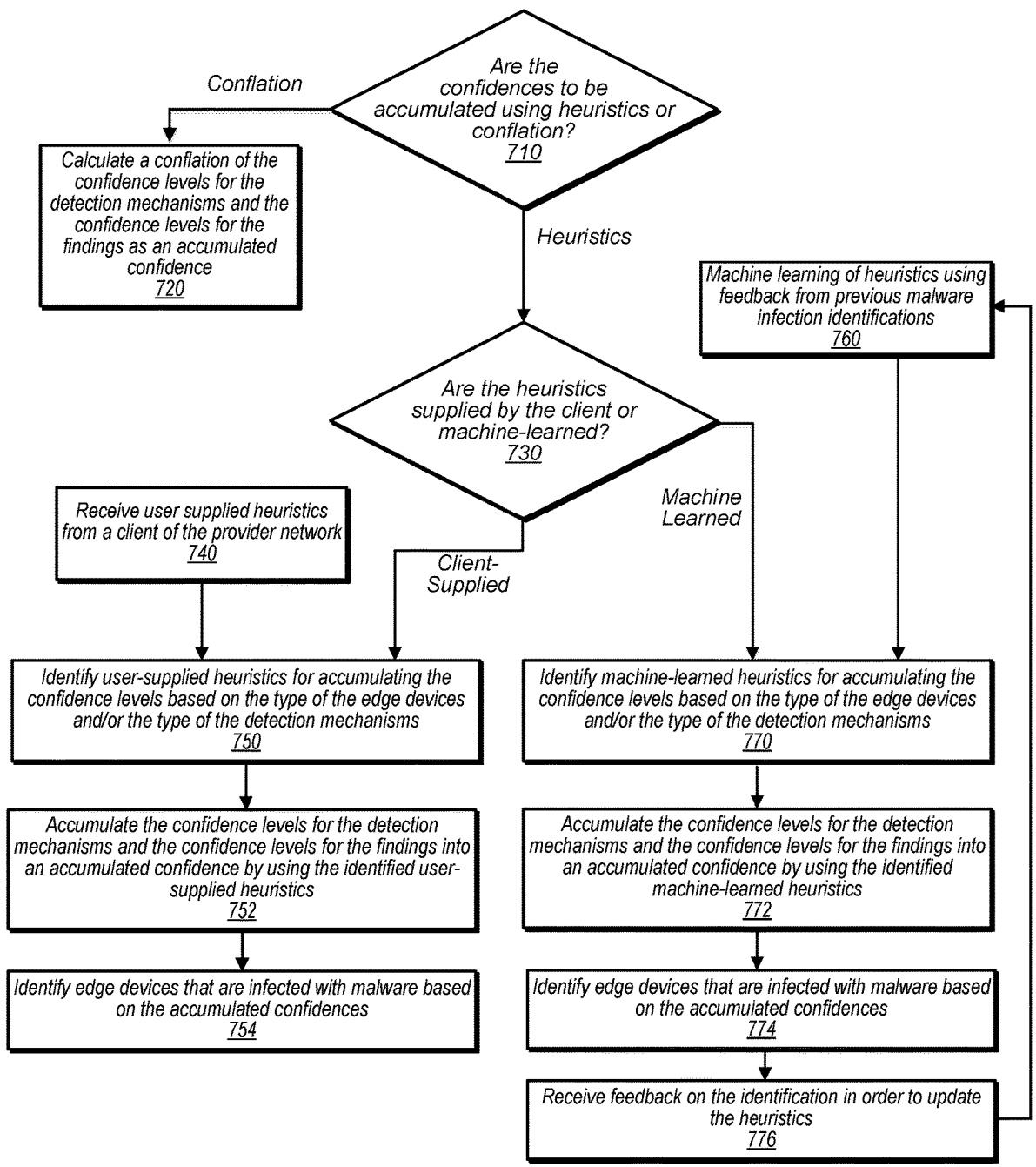
FIG. 7 is a flowchart of an illustrative method of identifying edge devices that are infected by malware using confidences that are accumulated in different ways, according to some embodiments.

FIG. 7 is a flowchart of an illustrative method of identifying edge devices that are infected by malware using confidences that are accumulated in different ways, according to some embodiments. The flowchart begins in block 710 which asks if the confidences are to be accumulated using heuristics or conflation. If the confidences are to be accumulated using conflation, then the flowchart transitions to block 720 which calculates a conflation of the confidence levels for the detection mechanisms and the confidence levels for the findings as an accumulated confidence. Else if the confidences are to be accumulated using heuristics, then the flowchart transitions to decision block 730.

In decision block 730, the flowchart determines if the heuristics are supplied by the client, or if they are machine-learned. If the heuristics are supplied by the client, then the flowchart transitions to block 750. Sometime previous to the execution of block 750, block 740 occurs where the method receives user supplied heuristics from a client of the provider network. Then, the method identifies user-supplied heuristics for accumulating the confidence levels based on the type of the edge devices and/or the type of the detection mechanisms in block 750. The method accumulates the confidence levels for the detection mechanisms and the confidence levels for the findings into an accumulated confidence by using the identified user-supplied heuristics in block 552. The method then identifies edge devices that are infected with malware based on the accumulated confidences in block 754.

If the heuristics are instead machine-learned in decision block 730, then the flowchart transitions to block 770. Sometime previous to the execution of block 770, block 768 in which machine learning of heuristics using feedback from previous malware infection identifications occurs. Then in block 770, the method identifies machine-learned heuristics for accumulating the confidence levels based on the type of the edge devices and/or the type of the detection mechanisms. The method accumulates the confidence levels for the detection mechanisms and the confidence levels for the findings into an accumulated confidence by using the identified machine-learned heuristics in block 772. The method identifies edge devices that are infected with malware based on the accumulated confidences in block 774. Finally, the method receives feedback on the identification in order to update the heuristics in block 776. This feedback is fed into the machine-learning of the heuristics in block 760 where the heuristics are refined by machine-learning using feedback from previous malware infection identifications.

Figure 8:
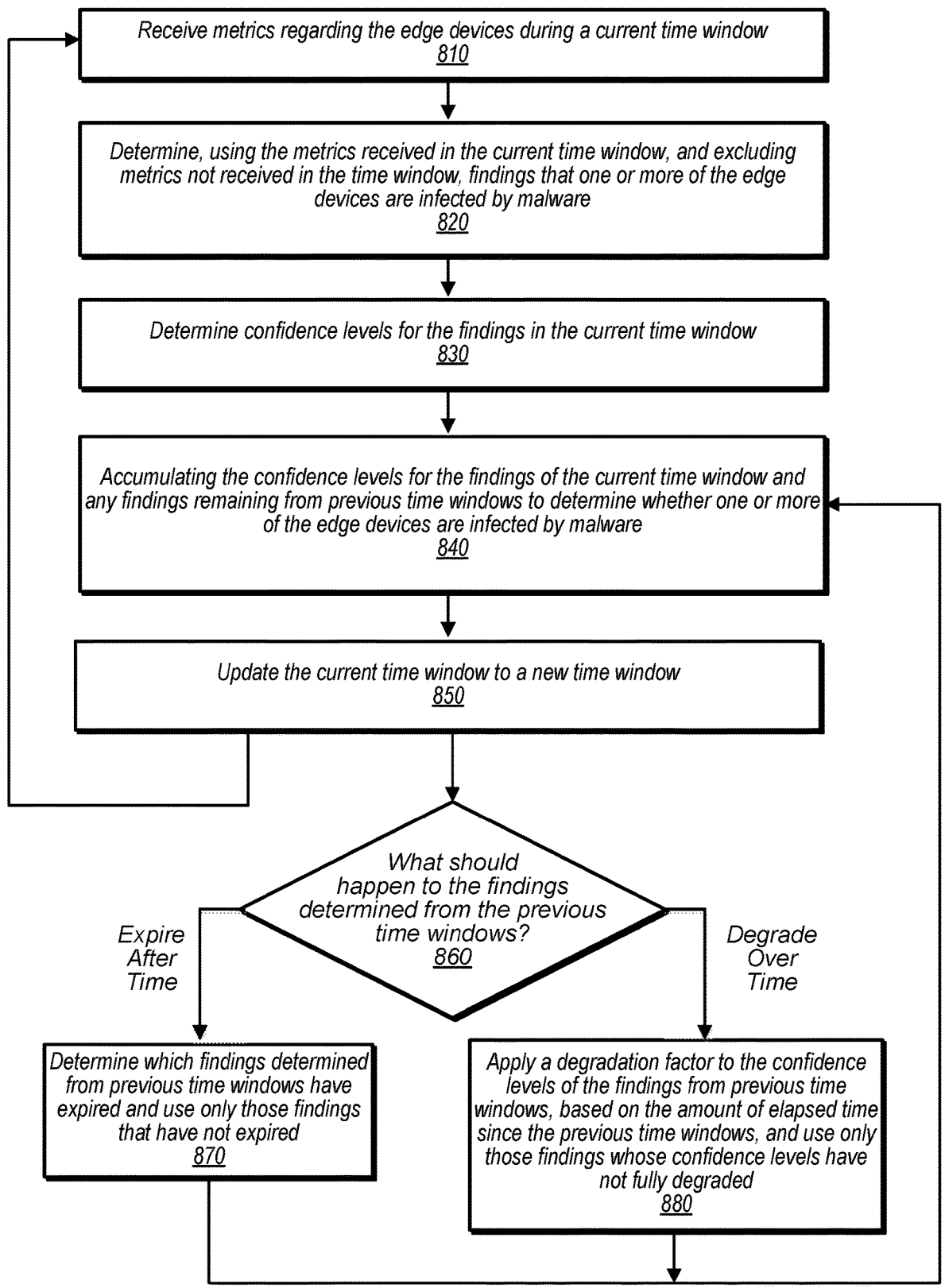
FIG. 8 is a flowchart of an illustrative method of receiving metrics during a current time window, determining findings and confidences based on those metrics received in the current time window, and accumulating confidences determined for the current time window as well confidences determined for previous time windows, according to some embodiments.

FIG. 8 is a flowchart of an illustrative method of receiving metrics during a current time window, determining findings and confidences based on those metrics received in the current time window, and accumulating confidences determined for the current time window as well confidences determined for previous time windows, according to some embodiments. In some embodiments, not necessarily all the detection mechanisms will report findings at the exact same time. Different detection mechanisms might report findings at different points in time, in these embodiments. For example, when a device becomes infected, in the first 5 or 10 minutes the device might connect to a location to download an initial malware payload, which might be a bigger binary or bigger script which allows a bad actor to take control of the device and perform the bad acts that they want to do. After 10 minutes, then the malware might start performing the bad acts, where the bad acts might be bitcoin mining, or denial or service attacks, or using the device as a proxy, as some examples. The bad acts might change over time, in some examples. The infected device might start looking for other victims, for example, and start scanning the network, such as the internal network or external network, or start using specific IP ranges, or start randomly generating IP addresses, in order to search for other victims. Therefore, the various detection mechanisms might be triggered for an extended period of time, in some embodiments. It is common that some of malware activities coincide at the same time window, but some malware activities may happen at different time windows, depending on the type of malware.

Hence, in order to increase the detection rate, different detection mechanisms might use data from different time windows in order to determine findings and confidence levels of findings. For example detection mechanism (a) might have a time window of 1 hour where it looks at data from the past hour to determine findings and confidence levels for those findings for various edge devices. Additionally, detection mechanism (b) might have a time window of 1 day where it looks at data from the past day to determine findings and confidence levels for those findings for various edge devices. Some detection mechanisms might have the same time window, and some detection mechanisms might have their own time window that is different than the time window of other detection mechanisms. The time window of a detection mechanism might change, such as by clients and/or edge device owners, and/or by using machine-learning techniques, based on feedback, such as whether indications of infected devices produced using the detection mechanism were accurate or false positives.

In addition, recent findings and infection detection confidence of recent findings can be accumulated from multiple recent time slots or windows, in some embodiments. Detection memory can be implemented to include a look-back time window in which all the findings of detection mechanisms are accumulated together, in some embodiments. Multiple different types of detection memory can be used, depending on the embodiment. Some detection memories might only include very recent histories, some might include longer histories, and some might include histories of various lengths in between, depending on the embodiment. Once a detection memory reaches a point where a threshold is established, in some of these embodiments, then a finding can be reported.

The flowchart in FIG. 8 can be seen to begin in block 810 which receive metrics regarding the edge devices during a current time window. For simplicity, this flowchart assumes that metrics regarding edge devices are received using the same current time window, but as explained previously, different detection mechanisms might use data from different time windows in order to determine findings. The method transitions to block 820 which determines, using the metrics received in the current time window, and excluding metrics not received in the time window, findings that one or more of the edge devices are infected by malware. Again, for simplicity, this flowchart assumes that metrics regarding edge devices are received using the same current time window, however, as explained previously, some detection mechanisms might have the same time window, and some detection mechanisms might have their own time window that is different than the time window of other detection mechanisms. The method then determines confidence levels for the findings in the current time window in block 830. The method then transitions to block 840 which accumulates the confidence levels for the findings of the current time window and any findings remaining from previous time windows to determine whether one or more of the edge devices are infected by malware. How confidence levels for any findings remaining from previous time windows are determined will be explained below.

In block 850, the flowchart updates the current time window to a new time window. This can occur, for example, because time has elapsed past the expiration point of the current time window, and a new time window is needed in order to perform the actions of steps 810-840. A time window can be any length of finite time. It can be 1 second, 1 minute, 5 minutes, 10 minutes or 1 hour as some examples of time windows. The amount of time that the time window covers has past, then a new time window is needed. Block 850 updates the current time window to a new time window.

The execution of block 850 causes two subsequent blocks to be executed in the flowchart. First the flowchart transitions to block 810 to receive new metrics regarding the edge devices during the new time window (where the new time window was set as the current time window in block 850). Steps 810-850 are then re-executed in a loop using the new time window. In addition, the execution of block 850 causes the steps of 860-880 to also be executed, either before, during, or after the execution of blocks 810-840.

Decision block 860 determines whether the findings, and their corresponding confidences, determined from previous time windows (in previous executions of steps 820 and 830) should expire after a certain amount of time, or whether they should degrade over time. There are many different ways or methodologies to accumulate confidences from recent past findings, depending on the embodiment. As a first example option, a sliding accumulation time window can be used, in some embodiments. A system that uses this option might accumulate the confidences from all the findings reported during the past look-back time window, in some embodiments. Other embodiments might accumulate only some of the findings reported in the look-back time window. This look-back time window might be configured as 2 hours, for example. Other look-back time windows can be used in other embodiments.

This look-back time window might encompass multiple "current time windows" of blocks 810-840 such that the look back time window will accumulate findings and confidences from multiple "current time windows." For example, the current time window might be set to 5 minutes, which means that metrics are gathered in 5 minute intervals, and findings and confidences for those findings are determined based on those gathered 5-minute interval metrics. However, the look back time window might be 2 hours. Therefore, the findings and confidences from the previous twenty-four 5-minute windows are relevant for the accumulation of confidences in the 2-hour look back window. Therefore, if the method is implementing this As a first example option, then the decision block 860 transitions to block 870 which determines which findings determined from previous time windows have expired and use only those findings that have not expired. In the 2-hour look-back window example, all the findings and confidences determined in the past 2 hours are relevant, and therefore they will all be used in the next accumulation of confidences in block 840. Any findings and confidences determined more than 2-hours ago would be excluded. Block 870 then transitions to block 840, where the relevant previous findings and confidences from previous time windows are used in next accumulation of the confidences.

As a second example option, a decay factor can be applied to a finding's confidence levels to gradually decrease its impact in detecting an infection. This decay factor might be applied to the findings of all detection mechanisms, or only to the findings of selected detection mechanisms, depending on the embodiment. If the findings decay over time, then a decay function can be applied to the confidences computed in previous time windows in block 880, before those confidences are then used in the computation of a new or current accumulated confidence in block 840, for example. Therefore if the decision block 860 determines that the findings and corresponding confidences degrade over time, then the method transitions to block 880 which applies a degradation factor to the confidence levels of the findings from previous time windows, based on the amount of elapsed time since the previous time windows, and use only those findings whose confidence levels have not fully degraded. Block 880 then transitions back to block 840, where the relevant previous findings and confidences from previous time windows are used in next accumulation of the confidences.

Edge Device

Figure 9:
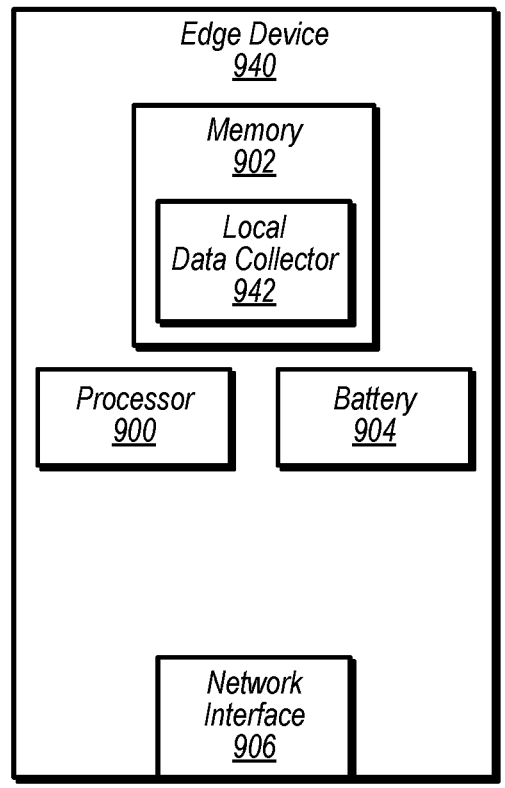
FIG. 9 is a block diagram of an edge device that implements a local data collector, according to some embodiments.

FIG. 9 is a block diagram of an edge device that implements a local data collector, according to some embodiments. In the depicted embodiment, the edge device 940 includes processor 900, a memory 902, a battery 904, and a network interface 906. The memory 902 includes a local data collector 942. Edge device 940 might be used as edge devices 140a . . . 140n and 160a . . . 160n in FIG. 1.

In some embodiments, the memory 902 includes executable instructions and the processor 900 executes the instructions in order to implement the local data collector 942. In embodiments, the network interface 906 communicatively couples the edge device 940 to the local network. Thus, the edge device 940 transmits data to the local network 130, 150 and potentially an edge devices monitor 132, 152 via the network interface 906. In embodiments, the network interface 906 may transmit data via a wired or wireless interface.

In some embodiments, the edge device and one or more of its components (e.g., processor and memory) may be relatively lightweight and smaller compared to components (e.g., processor and memory) used by the provider network to implement the model training service. For example, the size of one or more memories and/or one or more processors used by one or more servers of the provider network to implement the malware infection detection service may be at least an order of magnitude larger than the size of the memory and/or the processor used by the edge device.

In some embodiments, the malware infection detection service may operate within the context of a reinforcement learning process for training/modifying its internal finders, determinators, confidence levels, machine-learned heuristics or models. For example, the provider network may obtain topology data from the local network at multiple points in time (e.g., on a periodic basis) and based on the topology data, periodically modify or replace its internal finders, determinators, confidence levels, machine-learned heuristics or models to improve accuracy, improve confidence levels of the results (e.g. predictions), and/or to improve performance of the local network.

In embodiments, the reinforcement learning process is used to obtain a minimum level of confidence for predictions while minimizing one or more costs associated with obtaining the predictions. For example, the cost due to network traffic/latency and/or power consumption by edge devices may be minimized, while still obtaining a minimum level of accuracy. In embodiments, a level of confidence and/or a level of accuracy may be measured in terms of a percentage (e.g., 99% or 90.5%) or any other value suitable for quantifying level of confidence or accuracy, from no confidence or accuracy (e.g., 0%) to full confidence or accuracy (e.g., 100%).

In some embodiments, any of the edge devices, tier devices, or provider network described in FIGS. 1-9 may operate within the context of an event-driven execution environment. For example, one or more functions may be assigned to respective events, such that a particular function is triggered in response to detection, by the event-driven execution environment, of an event assigned to the particular function (e.g., receiving data from one or more particular edge devices). In embodiments, the function may include one or more operations to process the received data, and may generate a result (e.g., prediction).

Illustrative System

Figure 10:
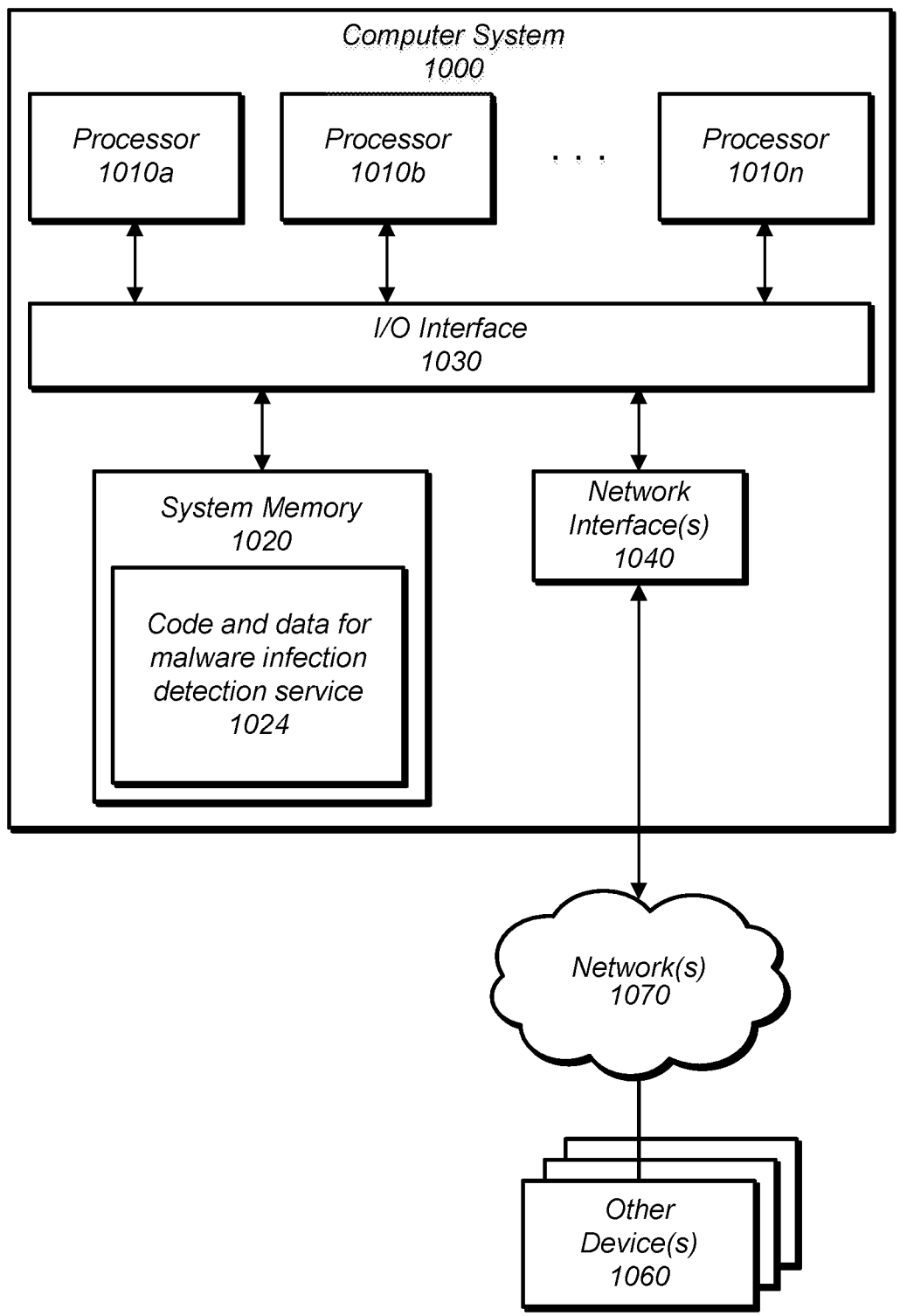
FIG. 10 is a block diagram illustrating an example computer system that may be used malware infection detection for edge devices, according to some embodiments.

FIG. 10 is a block diagram illustrating an example computer system that may be used for a malware infection detection service, according to some embodiments. In at least some embodiments, a computer that implements a portion or all of the methods and apparatus for a malware infection detection service as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as a malware infection detection service 104, for example, or as a backend resource host which executes one or more of backend resource instances or one or more of the plurality of compute instances in the compute service 294. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of a malware infection detection service, are shown stored within system memory 1020 as the code and data for a malware infection detection service 1024.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1, 2, 4, and 5, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 8 for implementing a malware infection detection service. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Any of various computer systems may be configured to implement processes associated with the provider network, edge devices, tier devices, or any other component of the above figures. In various embodiments, the provider network, edge devices, tier devices, or any other component of any of FIGS. 1-8 may each include one or more computer systems 1000 such as that illustrated in FIG. 10. In embodiments, the provider network edge devices, tier devices, or any other component may include one or more components of the computer system 1000 that function in a same or similar way as described for the computer system 1000.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices, each computing device comprising one or more processors and associated memory, wherein the one or more computing device are configured to implement a malware infection detection service of a provider network, wherein the malware infection detection service is configured to:
receive data from a plurality of Internet of Things ("IoT") devices of a remote network;
identify a plurality of detection mechanisms to detect an infection of one or more of the IoT devices by malware;
identify individual confidence levels for individual ones of the plurality of detection mechanisms, including a first confidence level of a first detection mechanism and a second confidence level of a second detection mechanism;
determine, using the first detection mechanism and based at least in part on the received data, a first specific finding that one or more of the IoT devices are infected by malware;
determine a third confidence level for the first specific finding;
determine, using the second detection mechanism and based at least in part on the received data, a second specific finding that the one or more IoT devices are infected by malware;
determine a fourth confidence level for the second specific finding;
determine an accumulated confidence that the one or more IoT devices are infected by malware based at least in part on the first confidence level of the first detection mechanism, the second confidence level of the second detection mechanism, the third confidence level for the first specific finding, and the fourth confidence level for the second specific finding; and
identify the one or more IoT devices as being infected by malware based at least in part on the determined accumulated confidence.

2. The system as recited in claim 1, wherein to identify the one or more IoT devices as being infected by malware based at least in part on the accumulated confidence further comprises:
determine that the accumulated confidence of the one or more IoT devices is above a configured threshold; and
provide, pursuant to the determination that the accumulated confidence of the one or more IoT devices is above the configured threshold, indications of the first and second detection mechanisms, indications of the confidence levels of the first and second detection mechanisms, indications of the first and second specific findings, and indications of the confidence levels of the first and second specific findings, to one or more destinations associated with the remote network.

3. The system as recited in claim 1, wherein the malware infection detection service of the provider network is further configured to:
in response to the identification of the one or more IoT devices as being infected by malware, cause a first responsive action to be initiated, wherein the first responsive action comprises one or more of: (a) triggering a client-provided function to be executed; (b) sending a message to the remote network or the client indicating the one or more infected IoT devices; or (c) terminating the security credentials for the particular one or more infected IoT devices in the provider network.

4. The system as recited in claim 1, wherein the malware infection detection service of the provider network is further configured to:
receive a third specific finding that the one or more IoT devices are infected by malware, and a confidence level for the third specific finding, from outside the provider network, wherein the third specific finding was determined outside the provider network using a third detection mechanism; and
wherein determining an accumulated confidence that the one or more IoT devices are infected by malware is further based on the confidence level for the third specific finding.

5. A method, comprising:
performing by a malware infection detection component:
identifying a plurality of detection mechanisms to detect an infection of one or more of edge devices of a remote network by malware;
identifying individual confidence levels for individual ones of the plurality of detection mechanisms;
receiving metrics regarding the one or more of edge devices of the remote network;
determining, using the plurality of detection mechanisms, and based at least in part on the received metrics, a plurality of findings that the one or more edge devices are infected by malware;
determining individual confidence levels for individual ones of the plurality of findings;
accumulating the confidence levels for the plurality of detection mechanisms and the confidence levels for the plurality of findings into an accumulated confidence to determine whether the one or more edge devices are infected by malware; and
identifying the one or more edge devices as being infected by malware based at least in part on the accumulated confidence, and the determined plurality of findings.

6. The method as recited in claim 5, wherein the identifying the one or more edge devices as being infected by malware based at least in part on the accumulated confidence, and the plurality of findings comprises:
determining that the accumulated confidence of the one or more edge devices is above a configured threshold; and
providing, pursuant to determining that the accumulated confidence is above a configured threshold, an indication of the plurality of detection mechanisms and the confidence levels for the plurality of detection mechanisms, and an indication of the plurality of findings and the confidence levels for the plurality of findings, to one or more destinations.

7. The method as recited in claim 5, further comprising:
in response to identifying the one or more edge devices as being infected by malware, causing a first responsive action to be initiated, wherein the first responsive action comprises one or more of: (a) triggering a client-provided function to be executed; (b) sending a message to the remote network or the client indicating the one or more infected edge devices; or (c) terminating the security credentials for the particular one or more infected edge devices in the provider network.

8. The method as recited in claim 5:
wherein the metrics regarding the one or more of edge devices of the remote network are received during a first time interval;
wherein the determining the plurality of findings that the one or more edge devices are infected by malware uses at least some of the metrics received during the first time interval, and excludes metrics not received during the first time interval; and
wherein the method further comprises:
receiving metrics during a second time interval, different from the first time interval, regarding the one or more of edge devices of the remote network;
determining, using the plurality of detection mechanisms, and based at least in part on the metrics received during the second time interval, a plurality of new findings that the one or more edge devices are infected by malware during the second time interval;
determining a confidence level for individual ones of the plurality of new findings; and
accumulating the confidence levels for the plurality of detection mechanisms, the confidence levels for the plurality of findings, and the confidence levels for the plurality of new findings, into a second accumulated confidence to determine whether the one or more edge devices are infected by malware during the second time interval.

9. The method as recited in claim 5:
wherein the metrics regarding the one or more of edge devices of the remote network are received during a first time interval and a different second time interval;
wherein at least one of the plurality of findings that the one or more edge devices are infected by malware is determined for the first time interval, using at least some of the metrics received during the first time interval;
wherein a first confidence level for the at least one of the plurality of findings is determined for the first time interval;
wherein at least a different one of the plurality of findings that the one or more edge devices are infected by malware is determined for the different second time interval, using at least some of the metrics received during the second time interval;
wherein a second confidence level for the at least different one of the plurality of findings is determined for the second time interval; and
wherein accumulating the confidence levels into an accumulated confidence is based, at least in part, on the first confidence level and the second confidence level.

10. The method as recited in claim 9:
wherein the confidence levels for the at least one of the plurality of findings determined for the first time interval degrade over time, as a function of the amount of time since the first time interval.

11. The method as recited in claim 5, wherein the plurality of detection mechanisms comprise one or more threat intelligence detection mechanisms that identify a device as being infected by a specific malware using the specific malware's known indicators.

12. The method as recited in claim 5, wherein the plurality of detection mechanisms comprise one or more behavioral pattern detection mechanisms that identify a device as being infected using the device's observed behavioral patterns that conform to various known stages of infection.

13. The method as recited in claim 5, wherein the accumulating the confidence levels for the plurality of detection mechanisms and the confidence levels for the plurality of findings into an accumulated confidence comprises:
calculating a conflation of the confidence levels for the plurality of detection mechanisms and the confidence levels for the plurality of findings.

14. The method as recited in claim 5, further comprising:
receiving feedback regarding whether the identifying of the one or more edge devices as being infected by malware is correct; and
updating the confidence level for the individual ones of the plurality of detection mechanisms based at least in part on the received feedback.

15. The method as recited in claim 5, wherein the one or more edge devices of the remote network comprises a first edge device and a second edge device, wherein receiving the metrics regarding the one or more of the edge devices of the remote network comprises receiving metrics regarding the first edge device, the method further comprising:

using at least some of the metrics regarding the first edge device as a proxy for at least some of the metrics regarding the second edge device.

16. One or more non-transitory computer-readable storage media storing program instructions, that when executed on or across one or more processors of a malware infection detection component, cause the one or more processors to:
identify a plurality of detection mechanisms to detect an infection of one or more of edge devices of a remote network by malware;
identify individual confidence levels for individual ones of the plurality of detection mechanisms;
receive metrics regarding the one or more of edge devices of the remote network;
determine, using the plurality of detection mechanisms, and based at least in part on the received metrics, a plurality of findings that the one or more edge devices are infected by malware;
determine individual confidence levels for individual ones of the plurality of findings;
accumulate the confidence levels for the plurality of detection mechanisms and the confidence levels for the plurality of findings into an accumulated confidence to determine whether the one or more edge devices are infected by malware; and
identify the one or more edge devices as being infected by malware based at least in part on the accumulated confidence, and the determined plurality of findings.

17. The one or more non-transitory computer-readable storage media of claim 16, wherein to identify the one or more edge devices as being infected by malware, the program instructions further cause the one or more processors of the malware infection detection component to:
determine that the accumulated confidence of the one or more edge devices is above a configured threshold; and
provide, pursuant to determining that the accumulated confidence is above a configured threshold, an indication of the plurality of detection mechanisms and the confidence levels for the plurality of detection mechanisms, and an indication of the plurality of findings and the confidence levels for the plurality of findings, to one or more destinations.

18. The one or more non-transitory computer-readable storage media of claim 16, wherein the program instructions further cause the one or more processors of the malware infection detection component to:
cause, in response to identifying the one or more edge devices as being infected by malware, a first responsive action to be initiated, wherein the first responsive action comprises one or more of: (a) trigger a client-provided function to be executed; (b) send a message to the remote network or the client indicating the one or more infected edge devices; or (c) terminate the security credentials for the particular one or more infected edge devices in the provider network.

19. The one or more non-transitory computer-readable storage media of claim 16, wherein the program instructions further cause the one or more processors of the malware infection detection component to:
identify one or more heuristics for accumulating the confidence levels based at least in part on the type of the one or more edge devices and the type of the plurality of detection mechanisms; and
wherein to accumulate the confidence levels for the plurality of detection mechanisms and the confidence levels for the plurality of findings into an accumulated confidence, the program instructions further cause the one or more processors of the malware infection detection component to:
use the one or more identified heuristics.

20. The one or more non-transitory computer-readable storage media of claim 19, wherein the one or more heuristics comprises one or more of: (a) heuristics supplied by a client; or (b) machine-learning heuristics.

\* \* \* \* \*